US 8,536,737 B2

(12) United States Patent
Azancot et al.

(10) Patent No.: US 8,536,737 B2
(45) Date of Patent: Sep. 17, 2013

(54) SYSTEM FOR INDUCTIVE POWER PROVISION IN WET ENVIRONMENTS

(75) Inventors: Yossi Azancot, Jerusalem (IL); Amir Ben-Shalom, Modiin (IL); Oola Greenwald, Mevasseret Zion (IL); Arik Rofe, Jerusalem (IL)

(73) Assignee: Powermat Technologies, Ltd., Neve Ilan (IL)

( * ) Notice: Subject to any disclaimer, the term of this patent is extended or adjusted under 35 U.S.C. 154(b) by 707 days.

(21) Appl. No.: 12/628,525

(22) Filed: Dec. 1, 2009

(65) Prior Publication Data

US 2010/0219693 A1    Sep. 2, 2010

Related U.S. Application Data

(63) Continuation-in-part of application No. PCT/IL2008/001347, filed on Oct. 12, 2008.

(60) Provisional application No. 61/193,456, filed on Dec. 2, 2008, provisional application No. 61/001,106, filed on Oct. 31, 2007, provisional application No. 60/996,460, filed on Nov. 19, 2007, provisional application No. 60/996,592, filed on Nov. 27, 2007, provisional application No. 60/996,922, filed on Dec. 11, 2007, provisional application No. 61/006,037, filed on Dec. 17, 2007, provisional application No. 61/008,319, filed on Dec. 20, 2007, provisional application No. 61/006,132, filed on Dec. 26, 2007, provisional application No. 61/006,238, filed on Jan. 2, 2008.

(51) Int. Cl.
*H01F 27/42* (2006.01)
*H01F 37/00* (2006.01)
*H01F 38/00* (2006.01)

(52) U.S. Cl.
USPC ......................................................... 307/104

(58) Field of Classification Search
USPC ................................... 307/104; 320/108
See application file for complete search history.

(56) References Cited

U.S. PATENT DOCUMENTS

| 3,771,085 A | 11/1973 | Hojo et al. |
| 3,938,018 A | 2/1976 | Dahl |
| 4,160,193 A | 7/1979 | Richmond |

(Continued)

FOREIGN PATENT DOCUMENTS

| EP | 0160990 A2 | 11/1985 |
| EP | 0160990 B1 | 1/1991 |

(Continued)

OTHER PUBLICATIONS

S.Y.R. Hui, et al., A New Generation of Universal Contactless Battery Charging Platform for Portable Consumer Electronic Equipment, IEEE Transactions on Power Electronics, vol. 20, No. 3, May 2005.

(Continued)

*Primary Examiner* — Carlos Amaya
(74) *Attorney, Agent, or Firm* — Brooks Kushman P.C.

(57) ABSTRACT

Inductive power providing systems suitable for wet environments are disclosed. Water resistant inductive outlets include primary inductors incorporated into water resistant worksurfaces. Water resistant inductive power receivers include secondary inductors incorporated into water resistant casings. Secondary inductors are configured to couple with primary inductors thereby providing power to electrical loads connected thereto.

8 Claims, 24 Drawing Sheets

(56) References Cited

U.S. PATENT DOCUMENTS

| | | |
|---|---|---|
| 4,431,948 A | 2/1984 | Elder et al. |
| 4,754,180 A | 6/1988 | Kiedrowski |
| 4,977,515 A | 12/1990 | Rudden et al. |
| 5,221,877 A | 6/1993 | Falk |
| 5,278,771 A | 1/1994 | Nyenya |
| 5,367,242 A | 11/1994 | Hulman |
| 5,455,466 A | 10/1995 | Parks et al. |
| 5,486,394 A | 1/1996 | Stough |
| 5,528,113 A | 6/1996 | Boys et al. |
| 5,550,452 A | 8/1996 | Shirai et al. |
| 5,600,225 A | 2/1997 | Goto |
| 5,713,939 A | 2/1998 | Nedungadi et al. |
| 5,734,254 A | 3/1998 | Stephens |
| 5,762,250 A | 6/1998 | Carlton et al. |
| 5,821,728 A | 10/1998 | Schwind |
| 5,821,731 A | 10/1998 | Kuki et al. |
| 5,907,285 A | 5/1999 | Toms et al. |
| 5,929,598 A | 7/1999 | Nakama et al. |
| 5,949,214 A | 9/1999 | Broussard et al. |
| 6,042,005 A | 3/2000 | Basile et al. |
| 6,211,649 B1 | 4/2001 | Matsuda |
| 6,230,029 B1 | 5/2001 | Hahn et al. |
| 6,396,935 B1 | 5/2002 | Makkonen |
| 6,436,299 B1 | 8/2002 | Baarman et al. |
| 6,441,589 B1 | 8/2002 | Frerking et al. |
| 6,484,260 B1 | 11/2002 | Scott et al. |
| 6,532,298 B1 | 3/2003 | Cambier et al. |
| 6,586,909 B1 | 7/2003 | Trepka |
| 6,624,616 B1 | 9/2003 | Frerking et al. |
| 6,644,557 B1 | 11/2003 | Jacobs |
| 6,673,250 B2 | 1/2004 | Kuennen et al. |
| 6,721,540 B1 | 4/2004 | Hayakawa |
| 6,731,071 B2 | 5/2004 | Baarman |
| 6,766,040 B1 | 7/2004 | Catalano et al. |
| 6,825,620 B2 | 11/2004 | Kuennen et al. |
| 6,888,438 B2 | 5/2005 | Hui et al. |
| 6,894,457 B2 | 5/2005 | Germagian et al. |
| D519,275 S | 4/2006 | Shertzer |
| 7,043,060 B2 | 5/2006 | Quintana |
| 7,126,450 B2 | 10/2006 | Baarman et al. |
| 7,132,918 B2 | 11/2006 | Baarman et al. |
| 7,164,255 B2 | 1/2007 | Hui |
| 7,180,248 B2 | 2/2007 | Kuennen et al. |
| 7,180,265 B2 | 2/2007 | Naskali et al. |
| 7,224,086 B2 | 5/2007 | Germagian et al. |
| 7,233,319 B2 | 6/2007 | Johnson et al. |
| D553,852 S | 10/2007 | Brandenburg |
| 7,385,357 B2 | 6/2008 | Kuennen et al. |
| 7,392,068 B2 | 6/2008 | Dayan et al. |
| 7,405,535 B2 | 7/2008 | Frerking et al. |
| 7,462,951 B1 | 12/2008 | Baarman |
| D586,809 S | 2/2009 | Jones et al. |
| 7,518,267 B2 | 4/2009 | Baarman |
| 7,522,878 B2 | 4/2009 | Baarman |
| 7,576,514 B2 | 8/2009 | Hui |
| D599,735 S | 9/2009 | Amidei et al. |
| D599,736 S | 9/2009 | Ferber et al. |
| D599,737 S | 9/2009 | Amidei et al. |
| D599,738 S | 9/2009 | Amidei et al. |
| D603,603 S | 11/2009 | Laine et al. |
| 7,612,528 B2 | 11/2009 | Baarman et al. |
| D607,879 S | 1/2010 | Ferber et al. |
| D611,407 S | 3/2010 | Webb |
| D611,408 S | 3/2010 | Ferber et al. |
| 2002/0057584 A1 | 5/2002 | Brockmann |
| 2002/0158512 A1 | 10/2002 | Mizutani et al. |
| 2003/0210106 A1 | 11/2003 | Cheng et al. |
| 2004/0023633 A1 | 2/2004 | Gordon |
| 2004/0195767 A1 | 10/2004 | Randall |
| 2004/0203537 A1 | 10/2004 | Yoshida et al. |
| 2004/0242264 A1 | 12/2004 | Cho |
| 2004/0261802 A1 | 12/2004 | Griffin et al. |
| 2005/0007067 A1 | 1/2005 | Baarman et al. |
| 2005/0068019 A1* | 3/2005 | Nakamura et al. ............ 323/355 |
| 2005/0083020 A1 | 4/2005 | Baarman |
| 2005/0130593 A1 | 6/2005 | Michalak |
| 2005/0169506 A1 | 8/2005 | Fenrich et al. |
| 2005/0192062 A1 | 9/2005 | Mickle et al. |
| 2005/0233768 A1 | 10/2005 | Guo et al. |
| 2006/0028176 A1 | 2/2006 | Tang et al. |
| 2006/0043927 A1 | 3/2006 | Beart et al. |
| 2006/0052144 A1 | 3/2006 | Seil et al. |
| 2006/0061325 A1 | 3/2006 | Tang et al. |
| 2006/0071632 A1 | 4/2006 | Ghabra et al. |
| 2006/0091222 A1 | 5/2006 | Leung et al. |
| 2006/0093132 A1 | 5/2006 | Desormiere et al. |
| 2006/0202665 A1 | 9/2006 | Hsu |
| 2007/0023559 A1 | 2/2007 | Scapillato et al. |
| 2007/0057763 A1 | 3/2007 | Blattner et al. |
| 2007/0076459 A1 | 4/2007 | Limpkin |
| 2007/0136593 A1 | 6/2007 | Plavcan et al. |
| 2007/0165371 A1 | 7/2007 | Brandenburg |
| 2007/0182367 A1 | 8/2007 | Partovi |
| 2007/0279002 A1 | 12/2007 | Partovi |
| 2008/0001922 A1 | 1/2008 | Johnson et al. |
| 2008/0030985 A1 | 2/2008 | Jeon et al. |
| 2008/0049988 A1 | 2/2008 | Basile et al. |
| 2008/0079388 A1 | 4/2008 | Sarnowski et al. |
| 2008/0132293 A1 | 6/2008 | Gundlach et al. |
| 2008/0157715 A1 | 7/2008 | Rosenboom et al. |
| 2008/0211320 A1* | 9/2008 | Cook et al. .................... 307/149 |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0072782 A1* | 3/2009 | Randall ........................ 320/107 |
| 2009/0075704 A1 | 3/2009 | Wang |
| 2009/0079387 A1 | 3/2009 | Jin et al. |
| 2009/0084705 A1 | 4/2009 | Justiss |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |

FOREIGN PATENT DOCUMENTS

| | | |
|---|---|---|
| EP | 0558316 A1 | 1/1993 |
| EP | 1990734 A1 | 11/2008 |
| GB | 2399466 A | 9/2004 |
| GB | 2399466 B | 11/2005 |
| WO | 9602879 A1 | 2/1996 |
| WO | 0215320 A1 | 2/2002 |
| WO | 0201557 A1 | 3/2002 |
| WO | 2008030985 A2 | 3/2003 |
| WO | 2006015143 A2 | 2/2006 |
| WO | 2008086080 A2 | 7/2008 |
| WO | 2008093334 A2 | 7/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010/025156 A1 | 3/2010 |
| WO | 2010/025157 A1 | 3/2010 |

OTHER PUBLICATIONS

X. Liu, et al., An Analysis of a Double-layer Electromagnetic Shield for a Universal Contactless Battery Charging Platform, IEEE 2006.
X. Liu, Equivalent Circuit Modeling of a Multilayer Planar Winding Array Structure for Use in a Universal Contactless Battery Charging Platform, 2006 IEEE.

S.C. Tang, et al., Evaluation of the Shielding Effects on Printed-Circuit-Board Transformers Using Ferrite Plates and Copper Sheets, 2002 IEEE.

Y.P. Xu, et al., Extended Theory on the Inductance Calculation of Planar Spiral Windings Including the Effect of Double-layer Electromagnetic Shield, 2007 IEEE.

Xun Liu, et al., Optimal Design of a Hybrid Winding Structure for Planar Contactless Battery Charging Platform, 2007 IEEE.

Xun Liu, et al., Simulation Study and Experimental Verification of a Universal Contactless Battery Charging Platform With Localized Charging Features, 2007 IEEE.

International Search Report and Written Opinion as filed in PCT/IL2008/001282, as mailed on Mar. 3, 2009.

International Search Report and Written Opinion as filed in PCT/IL2008001347, as mailed on Feb. 17, 2009.

International Search Report and Written Opinion as filed in PCT/IL2008/001348, as mailed on Oct. 12, 2008.

\* cited by examiner

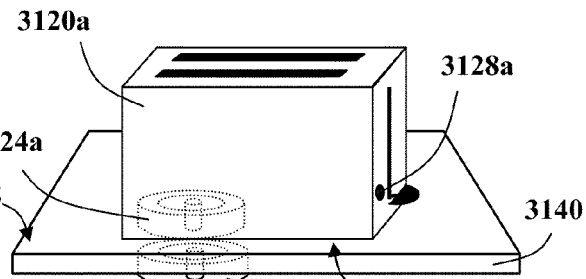
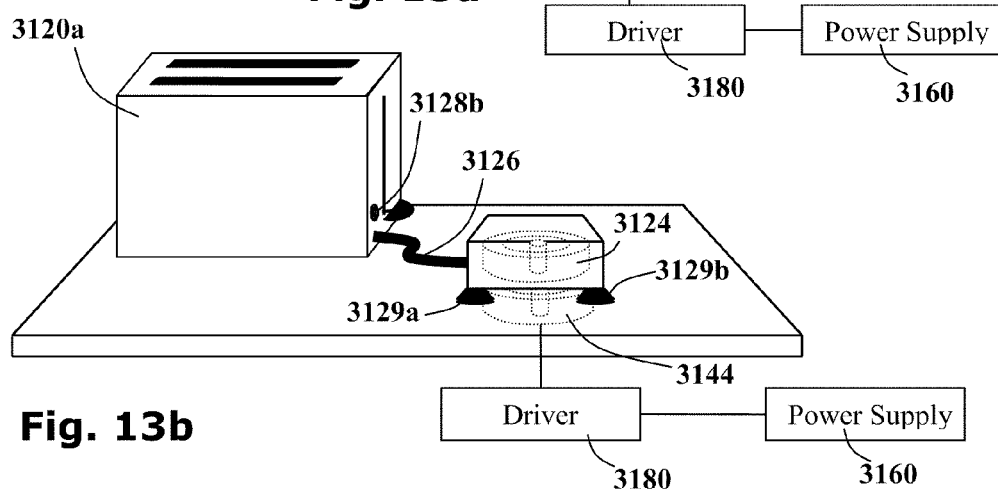
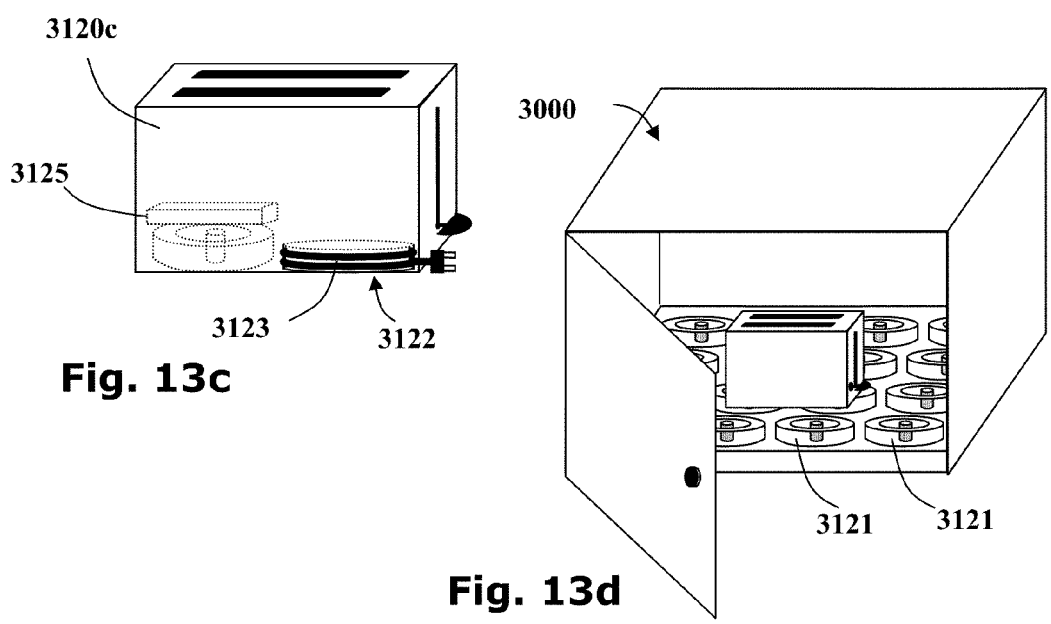

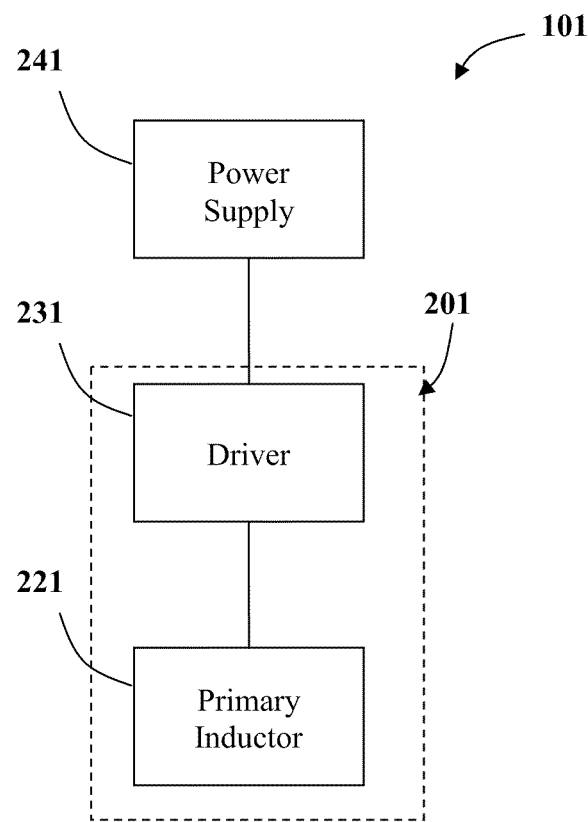
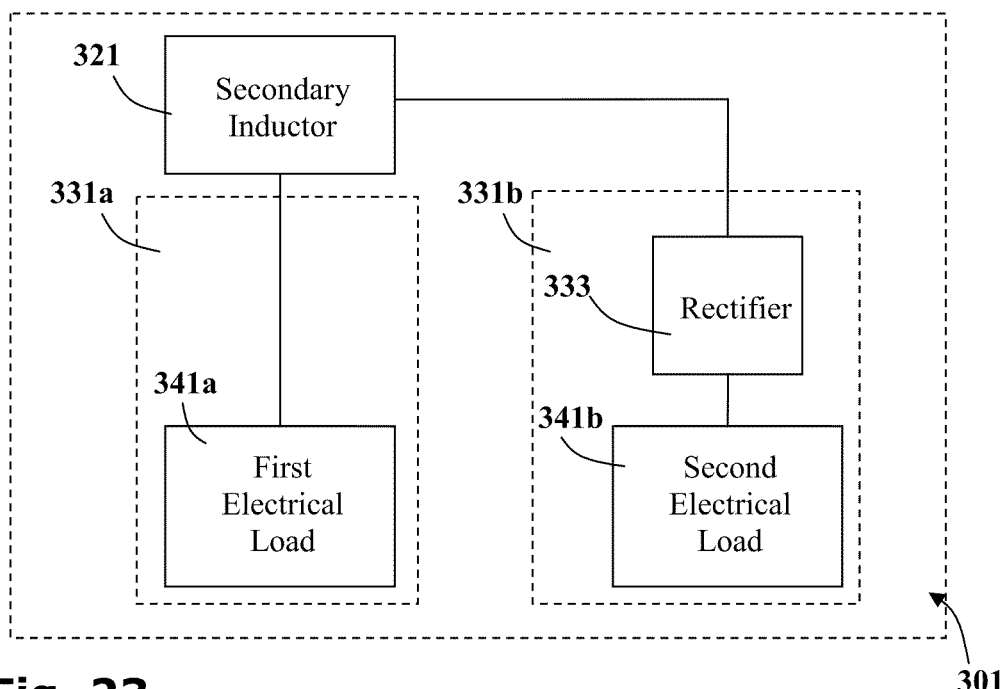
Fig. 23

SYSTEM FOR INDUCTIVE POWER PROVISION IN WET ENVIRONMENTS

CROSS-REFERENCE TO RELATED APPLICATIONS

This application is a continuation-in-part of PCT application Serial No. PCT/IL2008/001347 filed Oct. 12, 2008, which claims the benefit of U.S. provisional application Ser. Nos. 60/001,106 filed Oct. 31, 2007; 60/996,460 filed Nov. 19, 2007; 60/996,592 filed Nov. 27, 2007; 60/996,922 filed Dec. 11, 2007; 61/006,037 filed Dec. 17, 2007; 61/008,319 filed Dec. 20, 2007; 61/006,132 filed Dec. 26, 2007; 61/006,238 filed Jan. 2, 2008 and 61/193,456 filed Dec. 2, 2008, which are hereby incorporated by reference in their entirety.

BACKGROUND OF THE INVENTION

1. Field of the Invention

Embodiments of the present invention relate to providing inductive power in wet environments. In particular selected embodiments relate to inductive power outlets incorporated into water resistant work-tops and inductive power receivers incorporated into water resistant electrical devices.

2. Background Art

The provision of electric power where and when needed, is an important consideration when constructing buildings. The number and location of power outlets required for each room is dependent upon how the room will be used. Often, however, the future function of the room is not known during its construction. Consequently, it is often necessary to relocate power outlets long after a building is completed, which can be costly.

Conventional power outlets are typically situated at strategic points around the walls of rooms. A ring main to which the power sockets are connected may be provided. Such a ring main typically runs around a conduit pipe embedded in the wall, and electrical boxes in/on the wall are connected therewith. The location of power outlets is thus determined by the locations of the fixed electrical boxes. Once the wall has been finished, the relocation of power outlets is difficult.

In order to add or relocate power outlets, additional wiring must be provided. The additional wiring may itself be embedded into the wall by chiseling a groove into the surface thereof, running the wiring along the groove and rendering over the wiring, with plaster, pointing compound or the like. Additional power outlets are typically either sunk into depressions cut into the wall surface or alternatively, protruding electrical boxes are screwed or bolted there onto. Another method for relocating power outlets is to attach a power conduit to the outside of the wall and to run wiring through the external conduit, with power outlets being connected to the external conduit. Such a solution is commonly used in schools, colleges, laboratories and other institutions, particularly where the walls are constructed from solid stone, concrete or brick. It will be appreciated that this solution is costly, time consuming and unsightly.

U.S. Pat. No. 3,585,565 to Price describes an electrical tape and plug connector designed to facilitate and simplify the installation of electrical wiring. Substantially flat or film conductors are sandwiched between insulating layers of protective material. The sandwich construction includes a ground conductor insulated from the two mains current carrying conductors. One surface or side of the tape or cable is coated with a pressure-sensitive adhesive. A three-prong connector adapts the tape or cable to a utility outlet.

Price's solution allows wiring to lie flat against a wall surface which makes the wiring less obtrusive and simpler to install. However installation of the utility outlets requires the removal of insulation from the conducting tape and the connection of a special plug. Furthermore, the utility outlet once connected cannot be removed without exposing the bared conductor.

An alternative system is described in United States Patent Application No. 2002/0084096 to Chang. Chang describes an electric wire coupling device which includes one or more electric wires having one or more electric cables engaged and received in an outer rubber covering. One or more sockets each has a socket housing and two conductor members secured in the socket housing, which are aligned with the orifices of the socket housing for receiving plugs. The electric wires and/or the sockets each has an adhesive material for attaching to the supporting wall without further fasteners. The socket may include a side opening for coupling to the other electric wires.

In Chang's system the power strip and outlets are stuck onto a wall surface and protrude there from. Aside from being unsightly, if the protruding sockets are knocked they may become detached from the wall. Because the sockets and wires are supported only by the adhesive and not by additional fasteners, if the sockets become detached from the wall they will only be supported by the wire itself, thereby posing a safety hazard.

Conventional electrical sockets have holes therein into which the pins of corresponding plugs are inserted to form a conductive coupling. For safety, the power supplying side of the couple is generally the female part, and does not have bare conductive elements protruding there from. The plug coupled to the device is the corresponding male part, typically having bare pins. The size of the pins and holes are such that even a small child cannot insert his or her fingers thereinto. In high quality sockets, an earth connection is provided, and, only when a plug with a longer earth pin is inserted there into, is it possible to insert a pin (or anything else) into the holes connected to the current carrying live and neutral wires. Nevertheless, children do occasionally manage to insert pencils, pins and other objects into socket holes, sometimes with fatal results. Water can also cause shorting and may result in electrocution.

Since sockets are unsightly, the number of sockets installed on a wall is generally limited. Often, their position is not appropriate to changing requirements and extension leads are needed.

Inductive power coupling allows energy to be transferred from a power supply to an electric load without connecting wires therebetween. The power supply is wired to an inductive power outlet including a primary inductor across which an oscillating electric potential is applied thereby inducing an oscillating magnetic field therearound. The oscillating magnetic field may induce an oscillating electrical current in a secondary inductor, placed therewithin. In this way, electrical energy may be transmitted from the primary inductor to the secondary inductor by electromagnetic induction without the two inductors being conductively connected. When electrical energy is transferred from a primary inductor to a secondary inductor the pair are said to be inductively coupled.

Electrical devices may be adapted to draw energy from inductive power outlets by wiring their electric loads to such secondary inductors. Inductive power provision is particularly useful in wet environments, such as in a laboratory, kitchen or bathroom, where conventional power sockets may be hazardous.

For these and other reasons, there is a need for alternative power provision than occasionally positioned, conventional socket outlets along a wall and the present invention addresses this need.

SUMMARY OF THE INVENTION

It is an aim of the invention to provide a solution to a power providing system comprising at least one inductive power outlet incorporated into a bounding surface of a workspace, the inductive power outlet comprising at least one primary inductor connectable to a power supply via a driver; the driver for providing an oscillating voltage supply to the primary inductor; the primary inductor for inductively coupling with a secondary inductor wired to an electric load. According to various embodiments of the invention, the bounding surface is selected from the group comprising: walls, floors, ceilings, sinks, baths, doors and work surfaces.

Typically, the inductive power outlets are incorporated into prefabricated materials for incorporating into the bounding surfaces. Optionally, the prefabricated materials are selected from the group comprising: plasterboard, paper sheets, wallpaper, plasterers tape, doors, window frames, wall-tiles, fitted cabinets, kitchen counters, sinks, baths, sink surrounds, rugs, fitted carpets, parquet, linoleum, floor-tiles, non-slip matting, tiling, stone, artificial stone and paving.

According to a preferred embodiment of the invention a plasterboard panel is provided for affixing into the bounding surface, the plasterboard panel comprising a layer of gypsum sandwiched between two paper sheets and at least one pair of conductors for connecting the primary inductor to the power supply, the primary inductor being behind at least one of the paper sheets.

In various embodiments, the plasterboard panel is additionally characterized by at least one feature selected from:
 a ferromagnetic core for improving flux guidance between the primary inductor and the secondary inductor;
 at least one primary inductor being printed onto at least one paper sheet;
 the panel being water-resistant;
 the panel comprising a heating element;
 the panel comprising a high resistance primary inductor; and
 the primary inductor comprising an alloy having relatively high resistance such that oscillating currents therein, produce a heating effect.

According to another embodiment the invention provides a paper sheet for adhering to the bounding surface; the paper sheet comprising the at least one primary inductor; and at least one pair of conductors for connecting the primary inductor to the power supply. Optionally, the paper sheet may be characterized by at least one feature selected from:
 the paper sheet being a wallpaper;
 the primary inductor being adhered onto the back of a dielectric layer;
 the primary inductor comprising a conducting coil printed onto the paper; and
 the paper sheet comprising an adhesive layer for self adhering to the bounding surface.

In another embodiment of the invention a tape is provided for affixing onto the bounding surface, the tape comprising:
 a first layer having an adhesive surface;
 a second layer comprising:
 at least one pair of electrical conductors electrically isolated from each other; and
 the at least one primary inductor being electrically coupled to the pair of electrical conductors; and
 a third layer overlaying the second layer such that the pair of electrical conductors and the primary inductor are sandwiched between the first layer and the second layer.

Optionally, the power outlet tape is characterized by at least one feature selected from the group comprising:
 the second layer comprising a two dimensional array of primary inductors;
 a release layer releasably engaged to the adhesive surface of the first layer;
 a coating applied to the outer face of the third layer, the adhesive surface releasably engaging with the coating when the power outlet tape is rolled upon itself;
 the tape comprising a scrim layer of interwoven fibers; and
 the tape comprising a ferromagnetic core for improving flux guidance between the primary inductor and the secondary inductor.

In still another embodiment of the invention, a floor surface for the workspace is provided, the primary inductor being embedded therein and wired to the power supply via wiring under the floor surface. Optionally, the floor surface is selected from the group comprising: rugs, fitted carpets, parquet, linoleum, floor-tiles, non-slip matting, tiling, stone, artificial stone and paving.

According to a further embodiment of the invention, an electrical appliance is adapted to draw power inductively from at least one inductive power outlet, the electrical appliance comprising at least one secondary inductor. Typically, the electrical appliance further comprising a power storage means, for storing electrical energy for powering the appliance. Optionally, the power storage means is selected from the group comprising capacitors, accumulators, and rechargeable electrochemical cells.

In various embodiments, the electrical appliance is selected from the group comprising: standing lamps, video recorders, DVD players, paper shredders, fans, photocopiers, computers, printers, cooking appliances, fridges, freezers, washing machines, clothes dryers, heavy machinery, desk lamps, ambient lighting units, fans, wireless telephones, speakers, speaker phones, conference call base units, electric pencil sharpeners, electric staplers, display devices, electrical picture frames, VDUs, projectors, televisions, video players, music centers, calculators, scanners, fax machines, hot plates, electrically heated mugs, mobile phones, hairdryers, shavers, delapidators, heaters, wax-melting equipment, hair curlers, beard trippers, bathroom-scales, lights and radios, egg beaters, bread-makers, liquidizers, orange juice extractors, vegetable juicers, food-processors, electric knives, toasters, sandwich toasters, waffle makers, electrical barbecue grills, slow cookers, hot-plates, deep-fat fryers, electrical frying pans, knife sharpeners, domestic sterilizers, kettles, urns, radios, cassette players, CD players and electrical tin-openers, popcorn makers and magnetic stirrers.

According to yet another embodiment of the invention, a system is provided comprising a power platform that comprises at least one device-mounted inductive power outlet for inductively providing power to electrical loads, the system further comprising at least one secondary inductor for drawing power inductively from at least one inductive power outlet. Preferably, the power platform being incorporated into an item of furniture. Optionally, the item of furniture is selected from the group comprising chairs, tables, workbenches, partitioning walls cabinets and cupboards.

In preferred embodiments of the invention, the inductive power outlet comprises a positioning mechanism for moving the primary inductor behind the bounding surface. In various embodiments, the inductive power outlet is further characterized by at least one feature selected from the group comprising:

the positioning mechanism comprising a carriage;
    the primary inductor being mounted upon at least one of the group comprising roller-balls, wheels, skis and levitating magnets;
    the primary inductor being affixed to at least one guiding cable;
    the positioning mechanism being motorized;
    the positioning mechanism being remotely controllable by a user;
    the primary inductor being affixed to a first magnetic element configured to be pulled by a second magnetic element;
    the positioning mechanism further comprising a clutch for engaging the primary coil to the back face of the bounding surface, and
    the positioning mechanism further comprising a release mechanism for disengaging the primary inductor from the back face of the bounding surface.

Alternatively or additionally, the positioning mechanism comprises at least one rail upon which the primary inductor is slideably mounted. Typically, the rail is slideably supported by at least one of the group comprising tracks and pulleys. In other embodiments where the primary inductor is concealed behind a substantially opaque layer; the system further comprising at least one indicator for indicating the location of the primary inductor. Optionally, the system is further characterized by at least one feature selected from:

the indicator being incorporated within the bounding surface;
    the indicator comprising a visual display representing a map of the surface, the location of the primary inductor being indicated upon the map;
    the indicator further comprising a control panel for adjusting the location of the primary inductor, the location of the primary inductor being indicated upon the control panel;
    the indicator comprising at least one transmitter configured to transmit a locator beam, the locator beam being detectable remotely;
    the location of the primary inductor being determinable by external sensors; and
    the location of the primary inductor being determinable by external sensors selected from the group comprising: proximity sensors, volume sensors, infra-red sensors, ultrasonic sensors, magnetic sensors, Hall probes, inductance sensors and capacitance sensors.

In certain embodiments, the system includes an indicator comprises an emitter of radiation of a type and intensity capable of penetrating the substantially opaque layer and for allowing detection thereof from in front of the substantially opaque layer. Optionally, the system is further characterized by at least one feature selected from the group comprising:

the emitter being incorporated within the primary inductor and the radiation being selected such that the substantially opaque surface translucent to the radiation;
    the emitter comprising a light emitting diode;
    the emitter comprising the primary inductor;
    the radiation being detectable by a photodiode;
    the radiation comprising at least one of the group comprising: electromagnetic radiation, sound waves and ultrasonic waves;
    the radiation comprising infra-red radiation; the infra red radiation being detectable by a digital camera; and the location of the primary inductor being encoded into a location signal and the location signal being transmitted by the radiation.

It is a further aim of the invention to provide a protection system for preventing the power providing system from transmitting power in the absence of the electric load, the system comprising at least one circuit-breaker for disconnecting the primary coil from the power supply. Preferably, the protection system further comprises: at least one primary detector for detecting power transmitted by the primary inductor; at least one secondary detector for detecting the secondary inductor inductively coupled to the primary inductor; and at least one controller in communication with both the primary detector and the secondary detector, for triggering the circuit-breaker. Optionally, the primary detector is selected from the group comprising: magnetic sensors, heat sensors, electromagnetic radiation sensors and Hall probes.

In other embodiments of the invention, the primary inductor of the protection system radiates at a characteristic frequency f and the primary detector being configured to detect radiation at frequency f. Optionally, the protection system additionally comprises a modulator for tagging the radiation with a secondary tag indicating that the secondary inductor is inductively coupled to the primary inductor, wherein the secondary detector comprises a processor for demodulating the radiation and isolating the secondary signal. Certain embodiments additionally comprise a modulator for tagging the radiation with a primary tag uniquely identifying the primary inductor.

It is a further aim of the invention to present a method for preventing an inductive power outlet from transmitting power in the absence of an electric load, the inductive power outlet comprising at least one primary inductor wired to a power supply, for inductively coupling with a secondary inductor wired to the electric load, the method comprising the steps of:

Step (a)—the primary inductor transmitting power;
    Step (b)—detecting that the primary inductor is transmitting power;
    Step (c)—checking that the primary inductor is inductively coupled to the secondary inductor; and
    Step (d)—disconnecting the primary inductor from the power supply if no secondary inductor is detected.

Optionally, Step (b) may be selected from at least one of the steps:

communicating a signal from the primary inductor to a controller; and
    detecting a radiation emanating from the primary inductor.

Optionally, Step (c) may be selected from at least one of the steps:

communicating a signal from the secondary inductor to a controller;
    encoding a secondary signal within radiation emanating from the primary inductor; and
    monitoring the temperature in the vicinity of the primary inductor and checking for a significant rise in the temperature.

Optionally, Step (d) comprises sending at least one control signal to a controller indicating that the primary inductor is transmitting power with no secondary inductor present, and sending a trigger signal to a circuit-breaker connected between the power supply and the primary inductor.

Another aspect of the invention is to provide an electrical device comprising: a secondary inductor configured to inductively couple with a primary inductor wired to a power source, the secondary inductor being wired in parallel to a first circuit and a second circuit; the first circuit comprising a first electric load, and the second circuit comprising a rectification unit and a second electric load. Typically, the first electric load is wired directly to the secondary inductor.

In some embodiments, the second electric load is operable by direct current. Optionally, the second electric load is coupled to the rectification unit via a boost circuit. Preferably, the boost circuit comprises a switching circuit configured to approximate the power profile of a main power supply. In particular embodiments, the power source comprises a power supply having a single-phase power profile and the second load is operable by a multiphase power profile and the boost circuit is configured to provide the multiphase power profile.

Preferably, the first circuit and the second circuits are contained within a common casing. Optionally, the casing is impervious to water.

In various embodiments, the first electric load comprises a heating element. Optionally, the electrical device is selected from the group comprising: blenders, coffee-makers, popcorn-makers, bread-makers, heaters, incandescent light bulbs, juicers, toaster-ovens, toasters, water heaters, deep-pan friers, chip pans, slow cookers, hot-plates, meat grinders, centrifuges, ultrasonic cleaning devices and magnetic stirrers.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings:

FIG. 9b is a schematic representation of various appliances provided with dedicated inductive power adaptors, mounted upon the completed wall of FIG. 9a;

FIGS. 13a-d are schematic representations of further embodiments of electrical appliances, adapted to receive power from inductive outlets;

FIG. 23 is a block diagram showing the main elements of an inductive transfer system according to one embodiment of the invention;

DETAILED DESCRIPTION OF THE PREFERRED EMBODIMENT(S)

Figure 1:
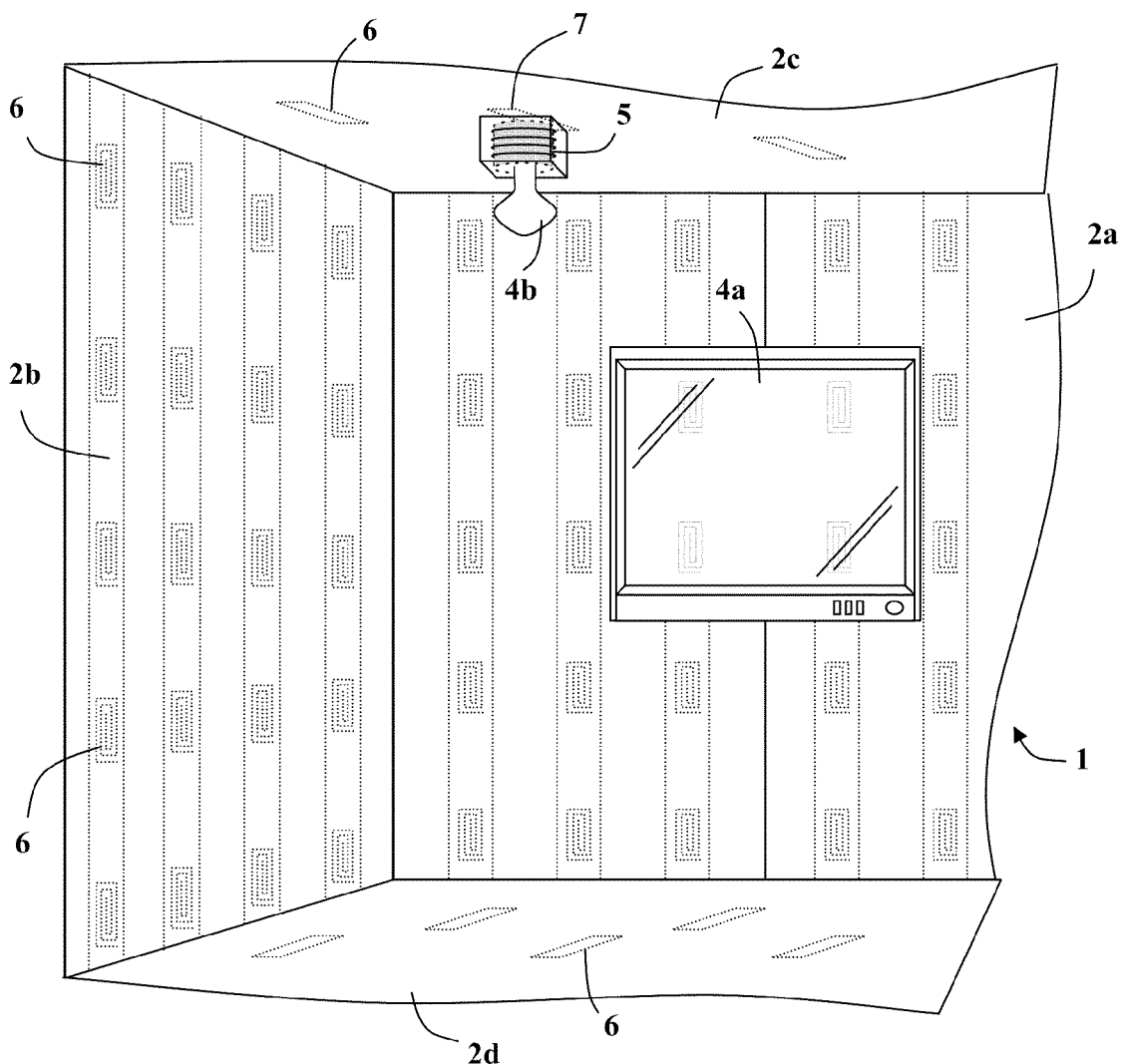
FIG. 1 is a schematic diagram of a corner of a room, incorporating a power providing system according to one embodiment of the present invention.

Reference is now made to FIG. 1 showing a schematic diagram of a power providing system according to an exemplary embodiment of the present invention. A workspace 1, such as a corner of a room, bounded by walls 2a, 2b, a ceiling 2c and a floor 2d, contains a variety of electrical appliances 4, such as a television set 4a and a light fixture 4b, for example. Such electrical appliances 4 are adapted to draw power from inductive power outlets 6. It is a particular feature of one aspect of the invention that inductive power outlets are incorporated into the bounding surfaces 2 of the room, such as the walls, ceiling and flooring thereof.

Inductive power coupling allows energy to be transferred from a power supply to an electric load without a conduction path being provided therebetween. A power supply is wired to a primary inductor and an oscillating electric potential is applied across the primary inductor which induces an oscillating magnetic field. The oscillating magnetic field may induce an oscillating electrical current in a secondary inductor placed close to the primary inductor. In this way, electrical energy may be transmitted from the primary inductor to the secondary inductor by electromagnetic induction without the two inductors being conductively connected. When electrical energy is transferred from a primary inductor to a secondary inductor, the pair are said to be inductively coupled. An electric load wired in series with such a secondary inductor may draw energy from the power source when the secondary inductor is inductively coupled to the primary inductor.

In the inductive power outlets 6, primary inductors 7 are wired to a power source, such as the electric mains for example, via a controller. The controller provides the electronics necessary to drive the primary coil. Such electronics may include, for example, a switching unit providing a high frequency oscillating voltage across the primary inductor for driving same.

Electrical devices 4 may receive power from the inductive power outlets via secondary inductors 5 configured to inductively couple with the primary inductors 7 of the inductive power outlets 6. As will be outlined in greater detail below, in some embodiments of the invention, secondary inductors 5 may be housed in inductive receiving units wired to the electrical devices 2. In other embodiments, secondary inductors may be incorporated into the electrical devices themselves.

Figure 2:
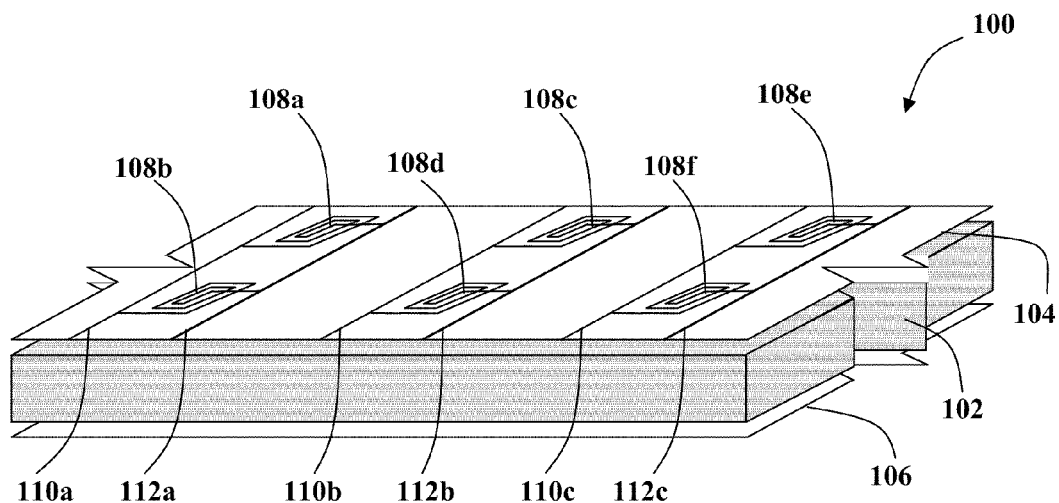
FIG. 2 is a schematic representation of a plaster board wall panel including a plurality of primary inductive coils and connecting wires for coupling to a mains power supply.

According to various embodiments of the invention, inductive power outlets may be incorporated into prefabricated building materials. With reference to FIG. 2, a plasterboard panel 100 in accordance with one embodiment of the invention is shown. The plasterboard panel 100 consists of a layer of building material 102, such as gypsum or the like, sandwiched between facing sheets 104, 106, that are typically of paper. Built into the plasterboard panel 100 are one or more primary inductors 108A-F and connecting wires 110, 112 that extend to the edge of the panel 100 allowing it to be coupled to a mains power supply (not shown).

If bulky, the primary inductors 108A-F may be embedded within the building material 102. However, it will be appreciated that the primary inductors such as inductive coils 108A-F may be relatively thin and may simply be adhered or stuck onto the facing sheet 104 designed to be the outer facing surface of the panel 100.

The primary inductors 108a-f and conducting wires 110, 112 may be fabricated from wires or metal foil, such as an aluminum or copper sheet. Alternatively, the primary inductive coils 108a-f and conducting wires 110, 112 may be printed or painted onto the facing sheet 104 using conductive inks.

Flux guidance cores may improve the electromagnetic coupling of primary coils 108 with secondary coils 604 (FIG. 6) brought into proximity with them. In certain embodiments of the invention, flux guidance cores (not shown) for example of ferrite or amorphous ferromagnetic material are associated with each primary coil and embedded in the walling. Further components such as ferromagnetic shielding elements or the like may additionally be incorporated therein.

Figure 3:
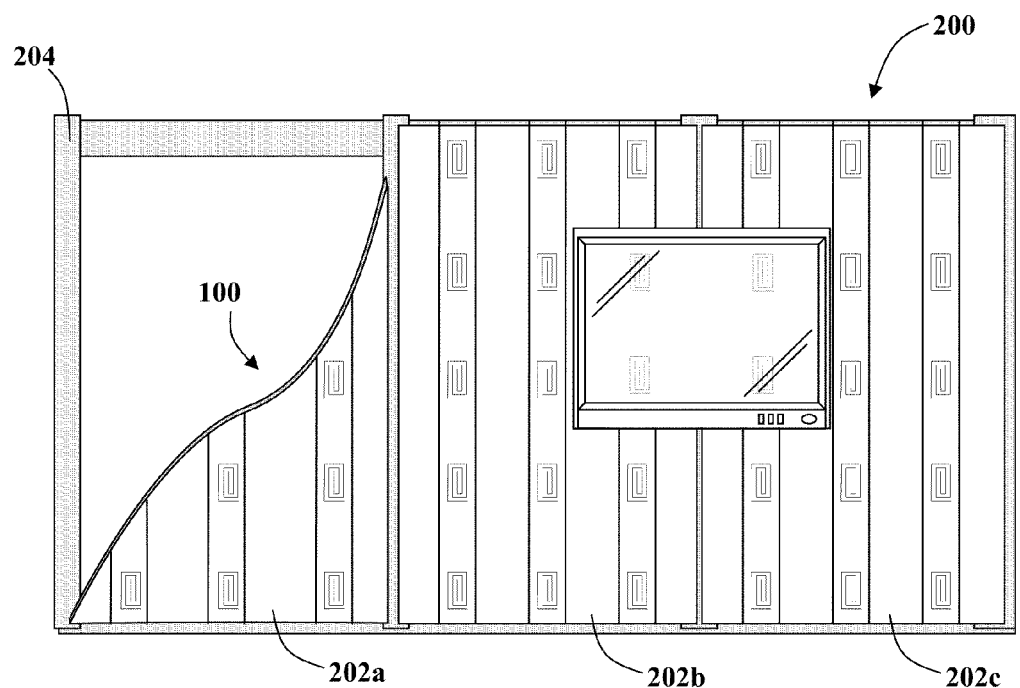
FIG. 3 is a schematic representation of a wall incorporating the plasterboard wall panel of FIG. 2.

With reference to FIG. 3, the plasterboard panel 100 may be incorporated into a wall 200, such as a standard drywall comprising panels 202 of plasterboard mounted onto a framework 204.

For use in bathrooms and the like, the plasterboard panel 100 may usefully be fabricated from 'green' water-resistant plasterboard. Indeed, it will be appreciated that the term plasterboard is used rather loosely herewith and may refer to other building materials, particularly those used for dry-walling, such as gypsum, plasterboard, gyproc, sheetrock or the like.

Figure 4:
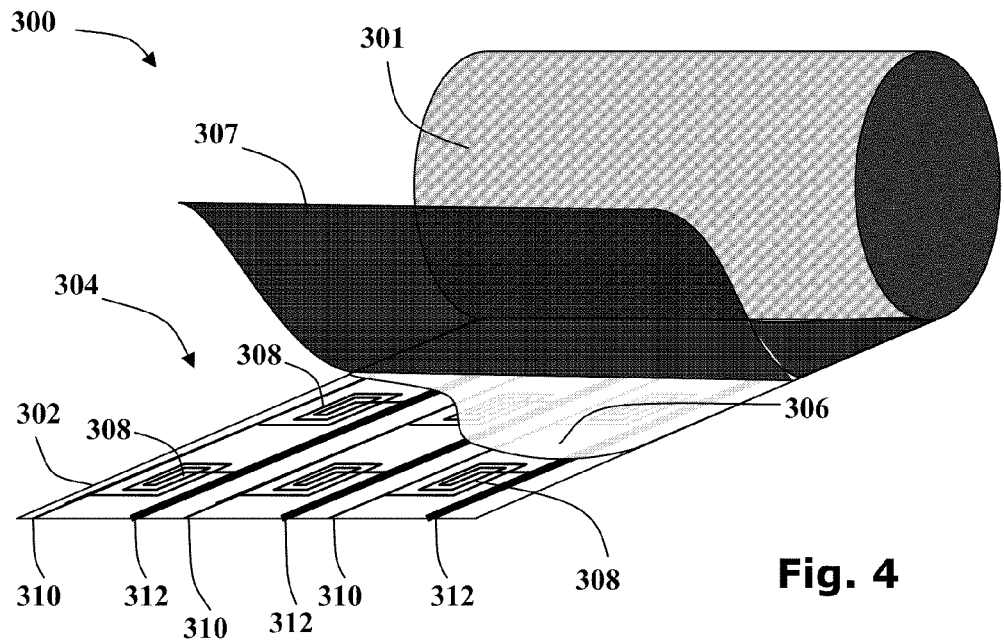
FIG. 4 is a schematic representation of a wallpaper including a plurality of primary inductive coils and connecting wires for coupling to a mains power supply.

Reference is now made to FIG. 4 showing a partially unrolled roll of wallpaper 300. The wallpaper 300 comprises a flexible sheet 302 of a laminar material that is typically a paper or fabric, the front surface 301 of which may be printed or patterned. On the back 304 of the flexible sheet 302, a plurality of primary inductive coils 308 are provided. The primary coils 308 may be fabricated from a metal foil and adhered onto the flexible sheet 302, or may comprise conductive inks printed onto the flexible sheet 302 by silk screening for example.

Figure 5:
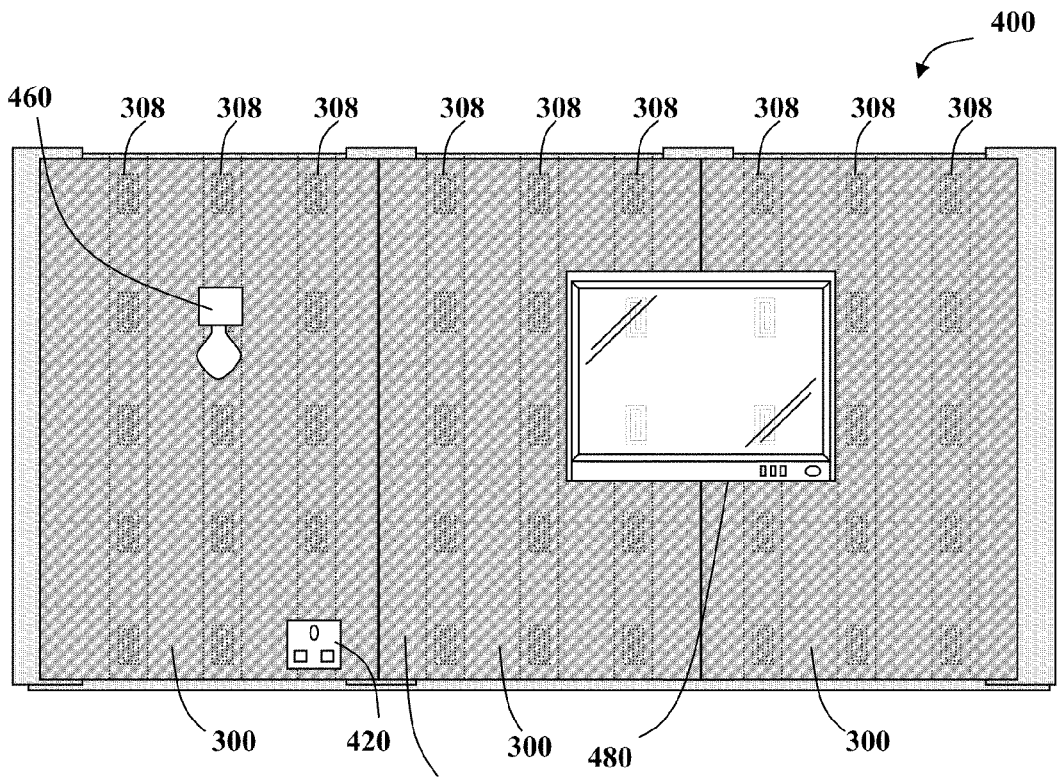
FIG. 5 is a schematic representation of a wall coated with the wallpaper of FIG. 4.
Figure 6:
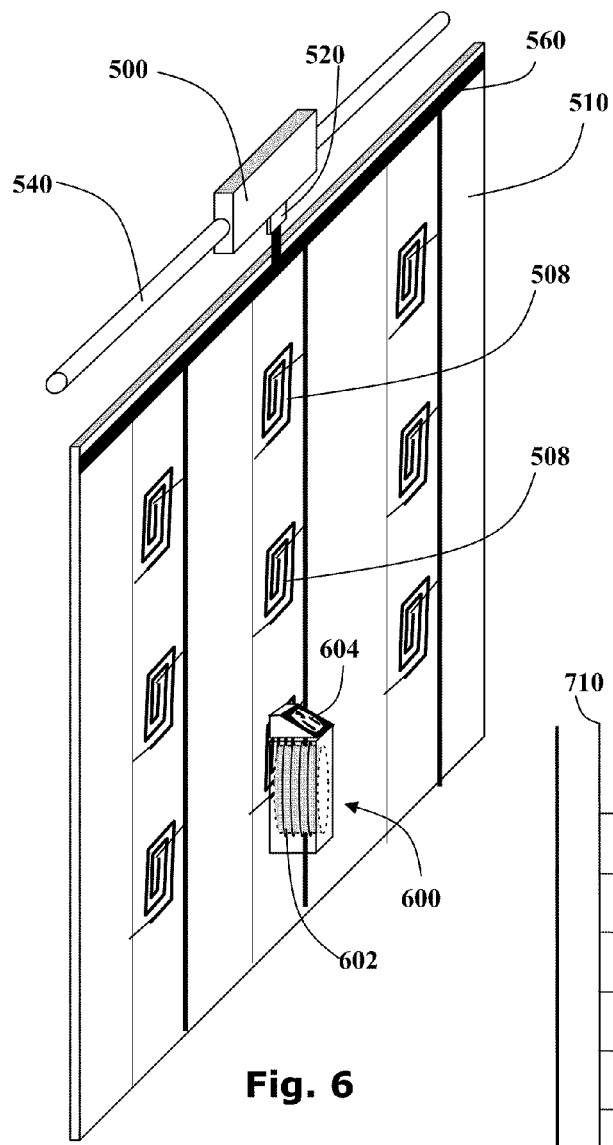
FIG. 6 is a schematic representation of a wall incorporating primary inductive coils connected to a control box.

With reference to FIG. 5, the wall paper 300 is designed to be stuck onto the surface of a wall 400. The primary coils 308 are configured to inductively couple with secondary inductive coils 602 (FIG. 6). Such secondary inductive coils 602 may be carried by power adaptors 420 used to provide power outlets attached to the surface 402 of the wall 400; with secondary inductive coils wired to electrical devices, such as light fixtures 460 or televisions 480, for example; or on furniture such as tables and the like (not shown), brought into proximity with the wall, and having conventional power sockets or inductive power outlets thereupon.

Power adaptors 420 may be secured to walls 400 using adhesives, or may be screwed or bolted into place. Alternatively, magnets may be embedded into the wall to magnetically couple with corresponding magnets within the power adaptors 420. Preferably, power adaptors 420 are readily exchanged between different power points without the need for additional wiring. It will be appreciated that power adaptors 420 may be incorporated within appliances such as a television 480, music system or the like. It is further noted that a single appliance such as a television 480 may span more than one primary inductive coil 308, thereby allowing the appliance to draw power from more than one power point. This may be useful in various applications, such as where the power needed by an appliance is greater than the power that may be supplied by a single primary inductive coil 308, for example.

Referring back to FIG. 4, the material from which the flexible sheet 302 is fabricated may usefully be heavily patterned or textured to conceal electrical components thereunder, such as primary inductive coils 308 on the back thereof, and electrical conducting strips 310, 312 extending to the edge of the paper 300 for coupling to a mains power supply.

Optionally, the paper 300 has an adhesive surface 306 on the back surface thereof, for adhering to a wall 400. Self adhesive, pre-glued wallpapers per se. are known, and technologies thereof may be adapted for the inductive papers described herein. Thus, optionally, a waxy release layer or backing sheet 307, such as a low density polyethylene or the like is adhered to the self adhesive layer 306. The backing sheet 307 may be peeled off, enabling the paper 300 to be adhered to a surface, such as a wall 400, via the adhesive surface 306 thereby exposed. Alternatively the front surface 301 may be coated with a waxy release material coating, such that when rolled up the self adhesive layer 306 is easily separated manually. Other possibilities will present themselves to wallpaper hangers.

Referring now to FIG. 6, in certain embodiments of the invention, control boxes 500, may be hard-wired to a ring main 540 to provide the electronics necessary to drive the primary coils 508 embedded or adhered to the walling 510. Driving electronics (not shown) may be provided. For example, these may include a switching unit providing high frequency oscillating voltage supply and an outlet selector for selecting the power outlet to be driven. The control box 500 may be connected to the primary coils 508 by crimple connectors 520 such as flat PCB connectors for example. Optionally connecting power tape 560 may be provided having no primary inductive coils but having conducting strips (not shown) for connecting between the walling 510 and a control box 500.

A power adaptor 600 may include a secondary inductive coil 602 hard wired to a conventional power jack 604 to which a conventional power plug (not shown) may be coupled. Alternatively, the secondary inductive coil 604 may be hard-wired directly to an electric load such as a light fixture 460 or the like. When the secondary inductive coil 604 in a power adaptor 600 is aligned with a primary inductive coil 508 in the wall 510, power may be inductively transferred between the coils thereby providing power to a load.

Figure 7:
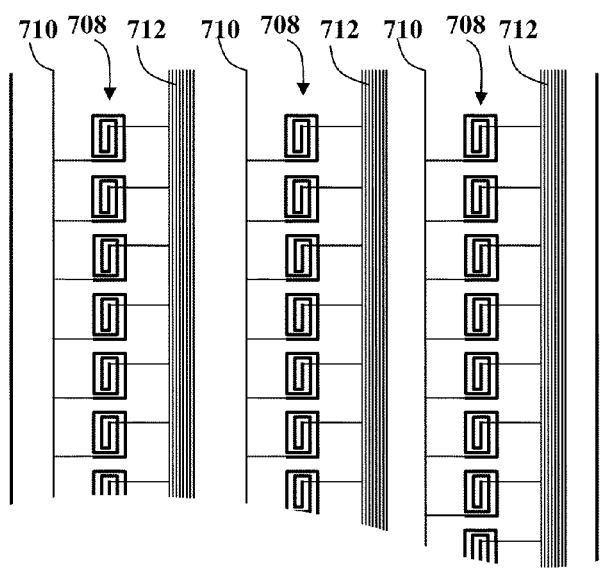
FIG. 7 shows an exemplary configuration of the electrical components embedded in a section of walling according to a further embodiment of the invention.

Referring now to FIG. 7 an exemplary configuration of electrical components is shown within a section of power walling 700 according to another embodiment of the invention. A common electrical conducting strip 710 connects with all the primary inductive coils 708 within a column. A control strip 712 consists of a bundle of conducting wires each of which is connected to only one of the primary inductive coils 708. Wherever the power walling is severed, the common electrical conducting strip 710 and the control strip 712 may be connected to a control box 500 (FIG. 5). The control strip 712 thus provides a means for selectively activating each primary inductive coil individually. The configuration of electrical components described above provides control of individual primary coils. It will be appreciated, however, that alternative configurations of electrical components are possible, as will be apparent to persons skilled in the art.

Typically before plastering over a wall, plasterers tape is used to cover over joints in the plaster board. Plasterer's tape, typically a scrim or hessian paper tape, helps to maintain the integrity of the surface and reduces the risk of the plaster cracking along the joints.

Self adhesive plasterer's tape is known, such as that described by Stough in U.S. Pat. No. 5,486,394. Stough's tape assists in rapid taping of seams between adjacent drywall units, and is provided in rolls. The tape has a first layer of flexible paper material with an inwardly facing pressure-sensitive adhesive coating thereon. A second layer of reinforcing woven fiber material overlies the first layer. A third layer of flexible material overlies the woven fiber material to encapsulate the fiber material between the first layer and the second layer. The third layer has an outwardly facing release coating such that the first layer adhesive will releasably engage the third layer for manual separation of the tape when rolled upon itself. A crease is formed along the center of the tape to facilitate positioning of the tape in a wall corner. The self release properties of the tape allow it to be easily dispensed and applied without the need to remove a backing. The adhesive is formulated to maintain adhesion even when wetted by an overlying layer of drywall mud. Furthermore the release coating on the third layer accepts and allows the adherence of drywall mud such as jointing compound, plaster and the like.

Figure 8A:
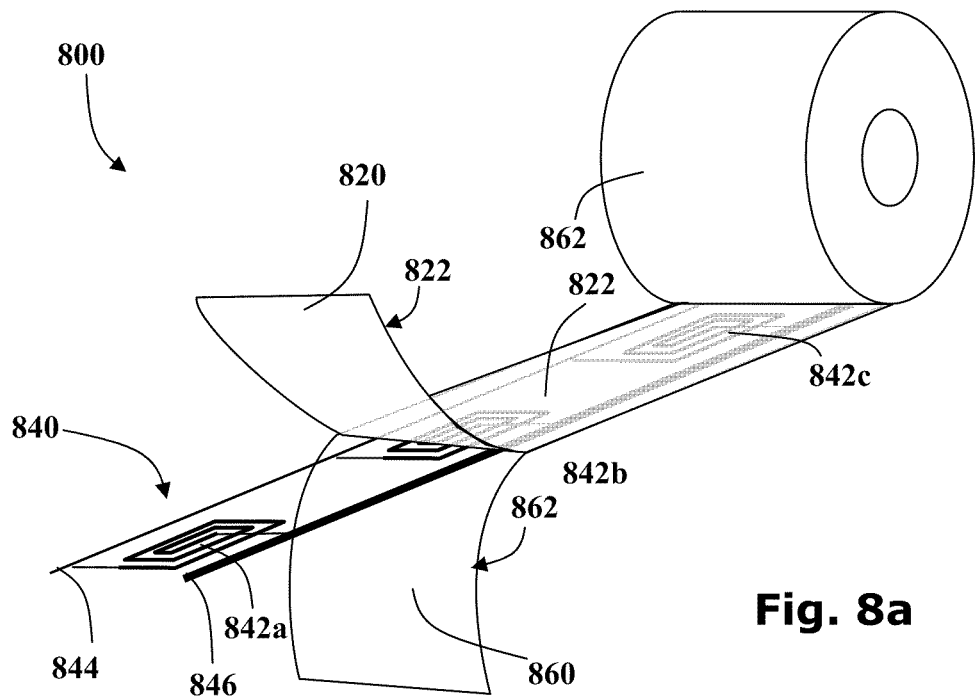
FIG. 8a is a schematic representation of a roll of power outlet tape.

Reference is now made to FIG. 8a showing a roll of power outlet tape 800 incorporating inductive power outlets 842 according to another embodiment of the invention. The power outlet tape 800 is constructed from three layers. The first layer 820 has a pressure sensitive adhesive surface 822 which may be adhered to a surface such as a wall. The second layer 840 holds the electrical components which include a series of power outlets 842 and electrical conducting strips 844, 846. The third layer 860 overlies the second layer 840 thereby sandwiching the electrical components between the first 820 and third layer 860.

The electrical components of the second layer 840 are electrical conducting strips 844, 846 and a series of primary inductive coils 842. The primary inductive coils 842 are configured to inductively couple with secondary inductive coils carried by power adaptors which may be used to provide power outlets upon the surface of a wall.

Preferably the outer surface 862 of the third layer 860 is coated with a waxy release material coating such as a low density polyethylene or the like, such that when rolled up the adhesive surface 822 of the first layer is easily separated from the outer surface 862 of the third layer 860, typically by hand. Alternatively a releasable cover slip (not shown) covered in a waxy release material may be adhered to the adhesive layer 822 to protect the adhesive surface from gathering dust and the like as well as to prevent the tape 800 from prematurely sticking to objects.

Figure 8B:
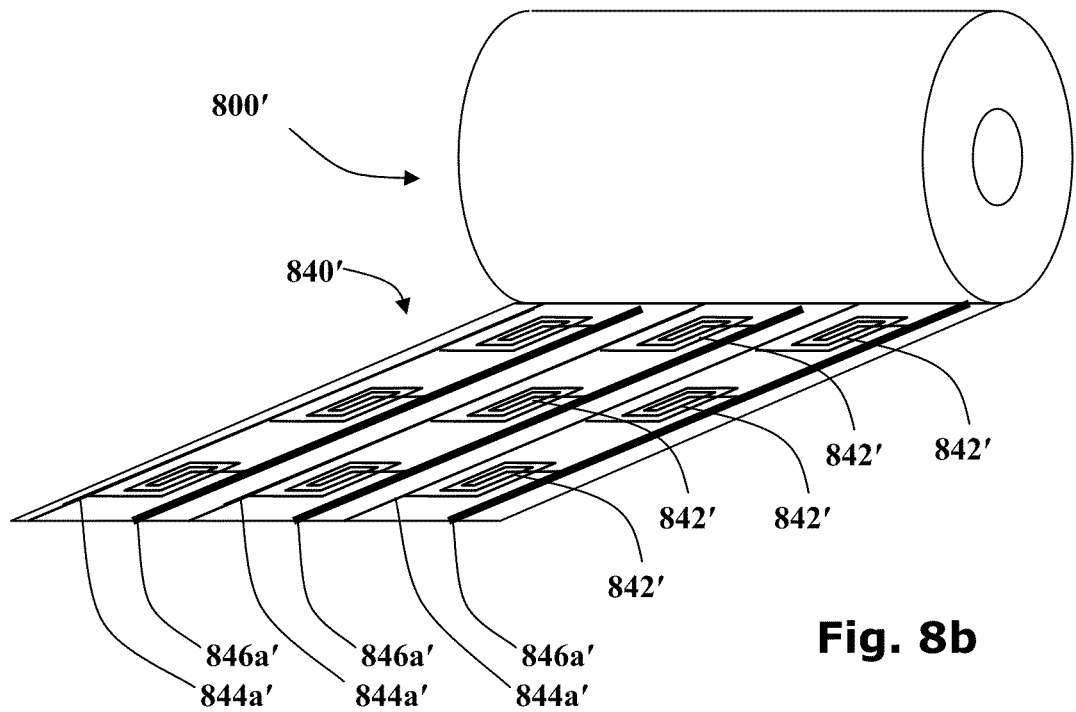
FIG. 8b is a schematic representation of a second, wider power outlet tape having a two dimensional array of primary inductive coils thereupon.

FIG. 8*b* shows an alternative embodiment of a power outlet tape 800' comprising a two dimensional array 840' of primary inductive coils 842'. Three rows of primary inductive coils are provide each having its own pair of conducting strips 844'*a-c*, 846'*a-c*. It is noted that such a roll of tape 800' may be useful for covering large areas for example table tops, work surfaces or the like. Thus the alternative power outlet tape 800' may be used to provide an array of remote power points.

Figure 9A:
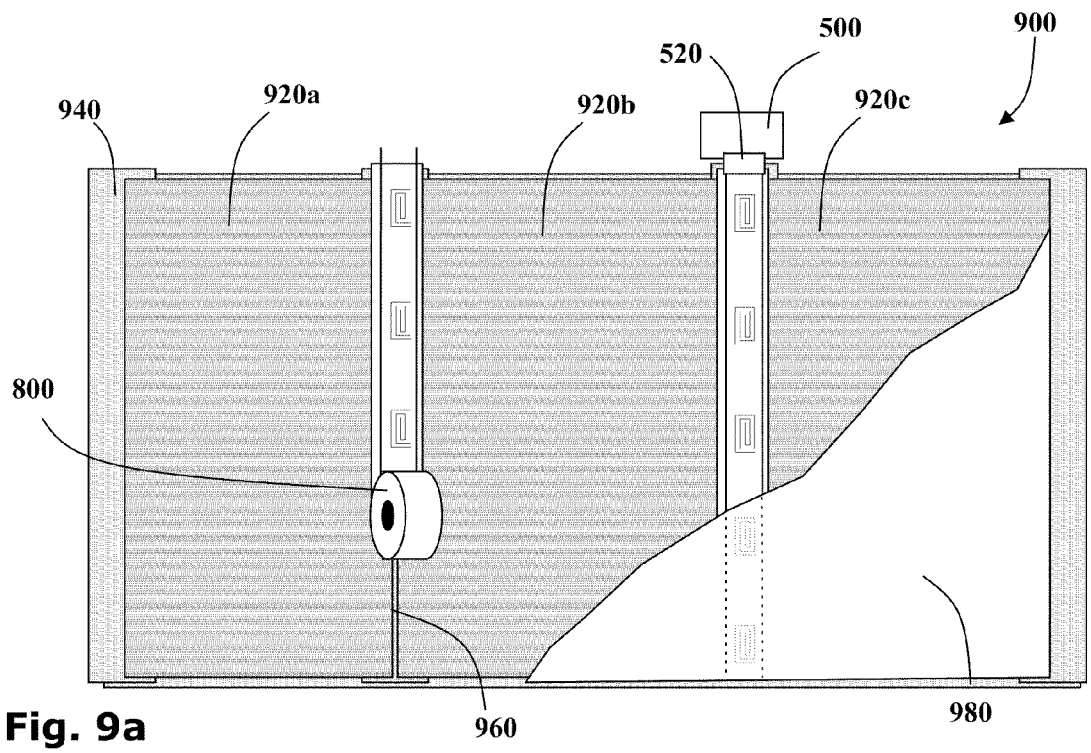
FIG. 9a is a schematic representation of the power outlet tape of FIG. 8a being applied to a wall.

With reference to FIG. 9*a*, the power tape 800 is shown being applied to a wall 900. Drywall boards 920 of material such as gypsum, plasterboard, gyproc, sheetrock or the like are mounted to a framework 940. In order to obscure the seams 960 between adjacent drywall boards 920, the segments of power outlet tape 800 are used to bridge between the adjacent drywall boards 920. The drywall boards 920 and taped seams 960 create a substantially flat surface upon which plaster 980 may be applied. It is noted that plaster 980 containing ferromagnetic material may provide additional flux guidance for the inductive couplings. In the prior art the bridging function has been performed by a paper, hessian or other scrim tape with no embedded electrical components.

The ends of the power outlet tape segments may be connected to the control box 500 by means of crimple connectors 520 such as flat PCB connectors for example. Optionally connecting power tape (not shown) may be provided having no primary inductive coils but including conducting strips for connecting between the power outlet tape 800 and a remote control box 500.

Control boxes 500, which are hard wired to a ring main 540, provide the electronics necessary to drive the primary induction coils 842, such as a switching unit providing high frequency oscillating voltage supply and an outlet selector for selecting the power outlet to be driven.

Figure 9B:
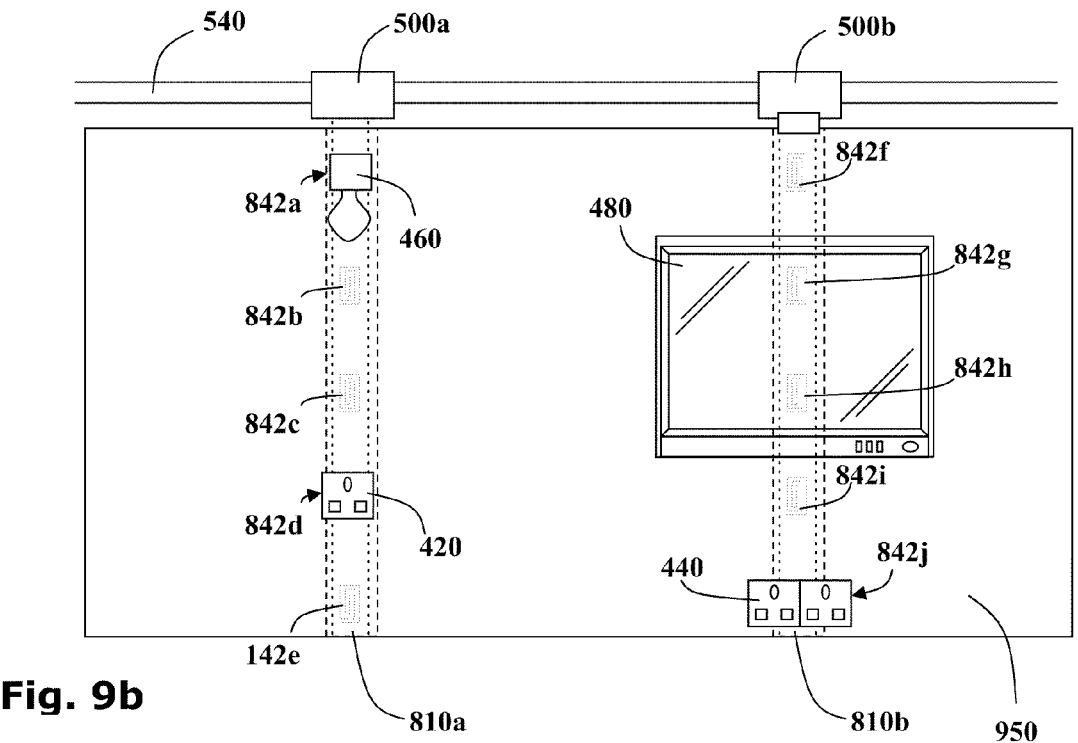
Figure 9C:
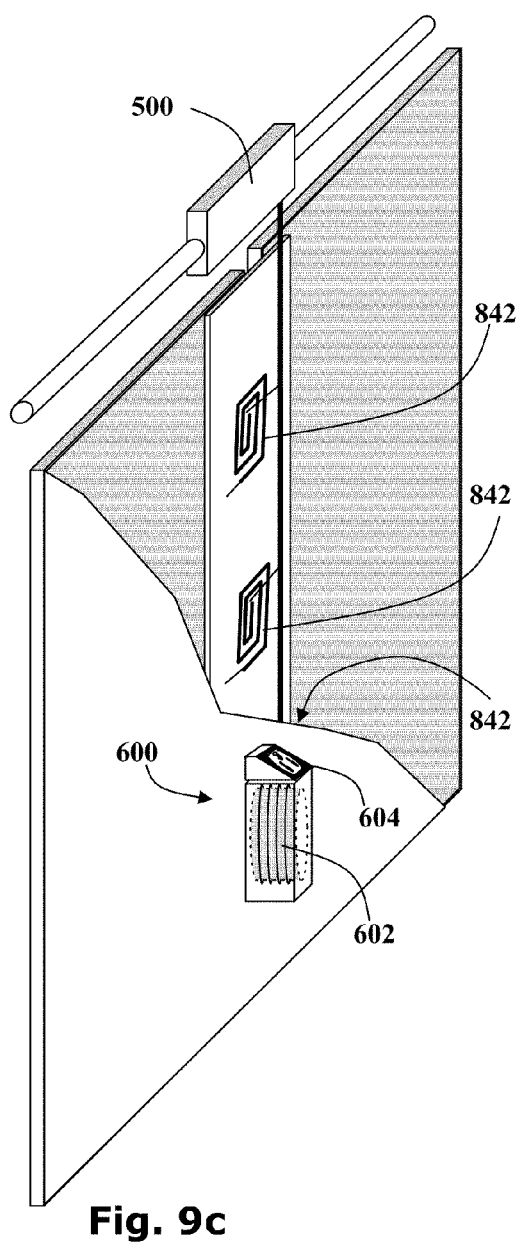
FIG. 9c is a schematic representation of an inductive power adaptor mounted to a wall.

Inductive power adaptors are used to provide power to wall-mounted appliances as shown in FIGS. 9*b* and 9*c*. With particular reference to FIG. 9*b*, a fully plastered wall 950 is shown, concealing two segments of power outlet tape 810*a*, 810*b* each having five power points at each of which is located a primary inductive coil 842*a-j*. Each segment 810*a*, 810*b* is connected to a control box 500*a*, 500*b* which is hard wired to a ring main 540. Various exemplary appliance units include, inter alia: a single jack power adaptor 420, a double jack power adaptor 440, a light fixture power adaptor 460 and a wall mounted television 480. Power adaptors 420, 440, 460 may be secured to the walls using adhesives or screwed into place. Alternatively, magnets may be embedded into the wall to magnetically couple with magnets in the adaptors 420, 440, 460. The power adaptors 420, 440, 460 are thus readily exchanged between power points without the need for any further wiring.

It will be appreciated that power adaptors may be embedded in appliances such as a television 480, a music system or the like. It is noted that a single appliance such as the television 480 shown in FIG. 9*b* may span more than one primary inductive coil 842*g*, 842*h*, thereby allowing the appliance to draw power from more than one power point if required, for example where the power needed is greater than the power supplied by a single primary inductive coil 842.

Referring to FIG. 9*c*, a representation of an inductive power adaptor 600 is shown coupled to a power point 842 along a segment of power outlet tape 810 which is connected to a control box 500. In the power adaptor 600 a secondary inductive coil 602 is hard wired to a conventional power jack 604 which may be coupled to a conventional power plug. Alternatively, the secondary inductive coil 604 may be hard-wired directly to an electric load such as a light fixture or the like. When the secondary inductive coil 604 in a power adaptor 600 is aligned with a primary inductive coil 842 in the power outlet tape 800, power may be transferred between the coils thereby providing power to a load.

Figure 10A:
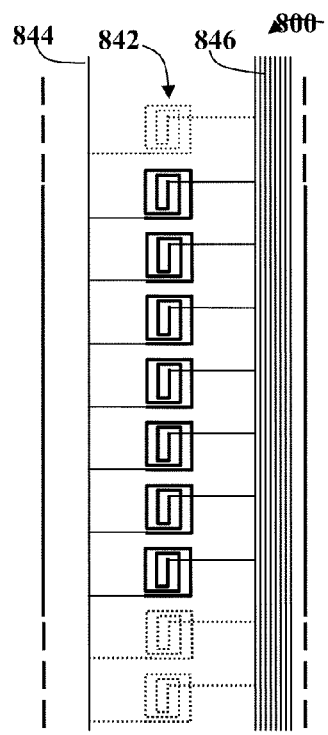
FIG. 10a shows a first configuration of the electrical components of the power outlet tape.
Figure 10B:
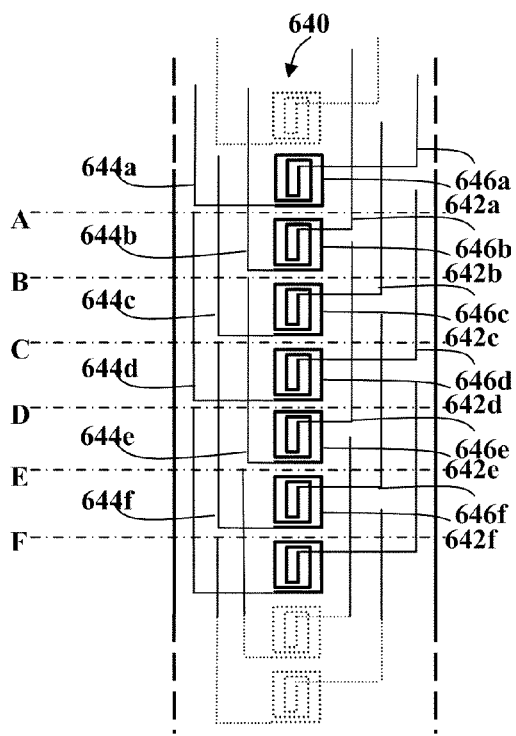
FIG. 10b shows a second configuration of the electrical components of the power outlet tape.

Two embodiments of the power outlet tape are shown in FIGS. 10*a* and 10*b*. Referring particularly to FIG. 10*a*, in the first embodiment, the electrical components 840 are configured such that a common electrical conducting strip 844 connects with all the primary inductive coils 842 along the tape. Such a control strip 846 may consist of a bundle of conducting wires each of which is connected to only one of the primary inductive coils 842.

A segment of the power outlet tape is detached from the roll, by severing the tape, perhaps by manual tearing or by using a cutting implement such as a pair of scissors or a knife. Wherever the power outlet tape is severed, the common electrical conducting strip 844 and the control strip 846 may be connected to a control box 500. With this first configuration, the control strip 846 may be used to selectively activate each primary inductive coil 842.

A second embodiment of the electrical components 640 of the power outlet tape is shown in FIG. 10*b*. Here, each primary inductive coil 642 is connected to its own pair of dedicated conducting strips 644, 646. The conducting strip pairs from each primary inductive coil 642 extend along the power outlet tape for a length sufficient that severing the tape along any line provides access to three pairs of conducting strips. Thus, severing the tape of the second embodiment along the line A for example provides contacts to the pairs of conducting strips 644*b-d*, 646*b-d* controlling each of the following three primary inductive coils 642*b*, 642*c*, 642*d*. Whereas severing the tape of the second embodiment along the line C for example, provides contacts to the pairs of conducting strips 644*d-f*, 646*d-f* controlling each of the next following three primary inductive coils 642*d*, 642*e*, 642*f*. It will be appreciated that, although only three primary inductive coils may be individually controlled in the power outlet tape shown here, the number of individually controllable primary inductive coils depends upon the length of the extension of the conducting strips 644, 646. Thus a range of tapes may be provided with varying conductor extension lengths for providing different numbers of individually controllable primary inductive coils.

Now U.S. Pat. No. 6,444,962 to Reichelt, incorporated herein by reference, describes a heating arrangement that consists of at least one heating element in the form of a flat element with two opposite-lying, essentially parallel conductors and a coating arranged therebetween for the generation of electromagnetic waves. The coating material is comprised of a binding agent, an insulating agent, a dispersion agent, water and graphite. The heating device also comprises a control device with a harmonic generator containing an electric component that has a rapid rate of current rise and is suitable for generating a high harmonic content. The harmonic generator is coupled to both electric conductors of the heating element in order to emit a spectrum of vibrations in natural molecular frequency ranges. A low-cost, highly effective heating system is thus provided, which, in one embodiment, is a flat panel that can be provided in coiled up form similar to wallpaper. Thus flat, wall mounted heating elements that may be incorporated within wallpaper are known.

Referring back to FIG. 1, it has been surprisingly found to be advantageous to provide inductive coils 6 or ferromagnetic shields having relatively high internal resistance, such that in addition to inducing an electrical current therein additionally produces a heating effect. Such a heating effect may be used as a convection heater for heating the room 1, and usefully, inductive coils having high resistivity are situated under the floor 2*d* or beneath a window, thereby facilitating effective heat circulation in the room.

In open plan areas, such as offices, factory workfloors, exhibition halls, warehouses and the like, it is often necessary to provide power to electrical devices at a distance from the walls. To avoid trailing wires, power may be provided from floor mounted or ceiling mounted sockets, however both of these approaches are problematic. Prior art floor mounted plugs and cables may be kicked or knocked which may damage the connections and even cause injury to bystanders and in many situations it is desirable for the floor to be kept clear of power sockets and trailing wires. Overhead power provision require cables to be lowered from the ceiling which may be unsightly and is impractical where the ceiling is high, such as in large halls and auditoria or for outdoor use, where there is no ceiling.

Figure 11:
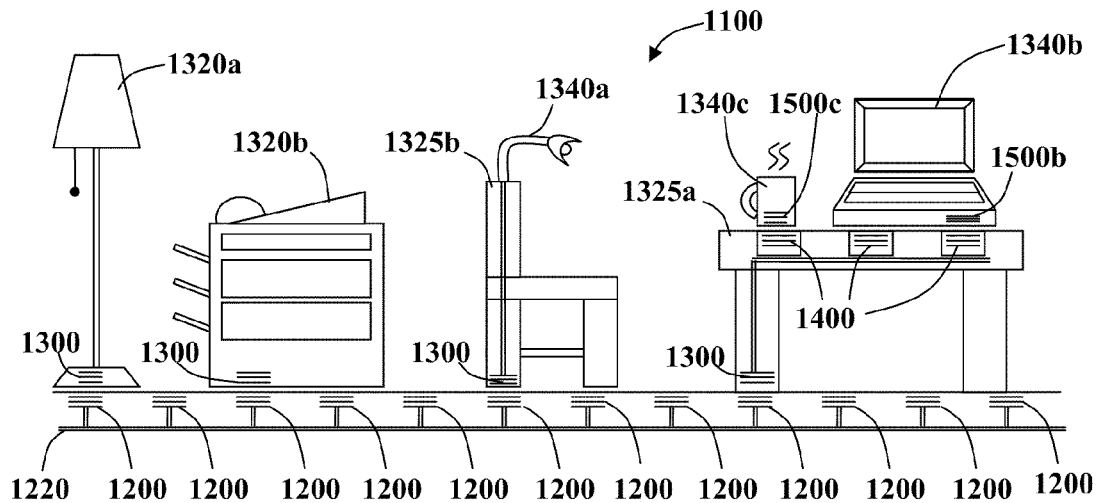
FIG. 11 shows an under-floor power providing system in accordance with a further embodiment of the present invention.

Referring to FIG. 11, a solution to the above problem is proposed, wherein floor mounted inductive power outlets 1200 are wired via underfloor wiring 1220 to a power source (not shown) either directly or via a control unit (not shown). The primary inductive coil units 1200 are configured to inductively couple with secondary coils 1300 placed thereabove, that are themselves coupled to electrical loads 1320, 1325. In this manner, open floor sockets are avoided. It will be appreciated that the system 1100 as herein described may be used with a variety of flooring types such as rugs, fitted carpet, parquet, linoleum, floor tiles, tiling, paving and the like.

Floor mounted devices 1320, such as a standing lamp 1320*a* or a photocopier 1320*b*, with secondary power coils 1300 in the bases thereof may be situated directly above the floor mounted primary coils 1200. Alternatively furniture 1325 such as a desk 1325*a* or a chair 1325*b* with secondary coil 1300 therein may be placed over the floor mounted primary coils 1200 and may serve as platforms for providing power to electrical devices 1340 placed thereupon such as a reading lamp 1340*a*, or desktop appliances 1340 such as a laptop computer 1340*b* or a novelty coffee mug 1340*c* which directly heats the liquid therein.

Such devices 1340 may be hardwired to furniture 1325, plugged into sockets (not shown) on the table top or may themselves include secondary coils 1500 and interface with primary coils 1400 on the surface of the table top 1326.

Other electrical devices into which secondary coils 1200 may be incorporated for aligning with primary coils 1200 of the system 1100 include household appliances such as standing lamps, televisions, music centers, video recorders, DVDs, and, if suitable wattage is made available, even washing machines, clothes dryers and the like, as well as cooking appliances such as ovens, cookers, hot-plates, fridges and freezers for example. In the workplace, the system 1100 may be provided to power typically floor mounted devices such as paper shredders, fans, photocopiers, computers, printers or heavy machinery.

It is further noted that furniture 1325 may be provided with primary coils 1400 incorporated therewithin for coupling with secondary coils 1500 associated with worktop appliances. Furniture into which such primary coils may be embodied include chairs, tables, workbenches, partitioning walls, cupboards or such like.

Worktop appliances having integral secondary coils 1500 which may be aligned with the primary coils 1400 incorporated within a tabletop 1326 for example include desk lamps, ambient lighting units, fans, wireless telephones, speakers, speaker phones, conference call base units, electric pencil sharpeners, electric staplers, display devices, electric picture frames, VDUs, projectors, televisions, videos, music centers, computers, calculators, scanners, printers, fax machines, photocopiers, paper shredders, hot plates, electrically heated mugs and mobile phones.

There are a number of electrical appliances for personal hygiene that are preferably used in the privacy of the bathroom. These include shavers, toothbrushes, hair-dryers, hair curlers and the like. Other electrical devices are also found in the bathroom, including heaters and lights. Water and electricity should be kept separate however. Electrocution in bathrooms is a real risk, and light switches are usually either located outside the bathroom, or are ceiling mounted with pull cords. These issues may be addressed by battery powered appliances, having disposable or rechargeable batteries. However, disposable batteries are expensive and ecologically damaging. Neither disposable nor rechargeable batteries are particularly reliable in that they seem to run out of power in the middle of tasks.

Bathroom walls are often tiled with ceramic tiles and sink surrounds are typically fabricated from natural or artificial polished stone, stainless steel, ceramic, or acrylics to provide easily cleaned surfaces that may be repeatedly washed. For safety, bathroom electricity sockets are typically covered with waterproof coverings. It will be appreciated that power outlet sockets, are less easily cleaned than such work-surfaces, since the socket holes for plug pins, and switches must be kept dry to prevent short circuits, or worse, electrocution.

By providing power to appliances via an inductive couple, the risk of electrocution within the bathroom can be minimized. Indeed, some appliances may be used within the bath.

Figure 12A:
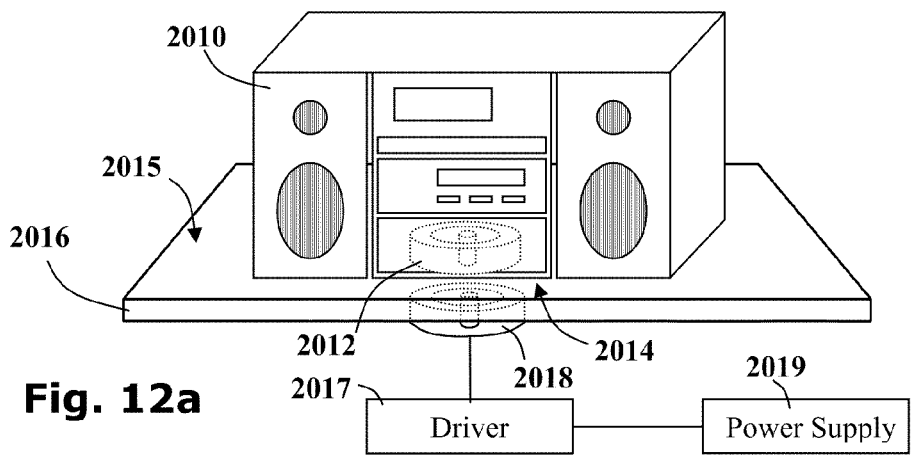
FIGS. 12a-f are schematic representations of various embodiments of electrical appliances provided with secondary coils, adapted to receive power from inductive outlets.

With reference to FIG. 12*a*, a schematic representation of an electrical appliance, such as a music player 2010 is shown. Instead of having a plug on a flex for plugging into a power outlet socket, a secondary coil 2012 is provided in the base 2014 thereof. The electrical appliance 2010 may be powered by placing it on a surface 2016, such as a sink surround, incorporating a primary inductive coil 2018, so that the secondary coil 2012 is aligned with the primary coil 2018.

The primary coil 2018 is wired to a power supply 2019 via a driver 2017 which provides the electronics necessary to drive the primary coil 2018. Driving electronics may include a switching unit providing a high frequency oscillating voltage supply, for example.

It will be appreciated that apart from a music player 2010 this powering solution may be appropriate to a wide range of other appliances and gadgets such as hairdryers, shavers, delapidators, heaters, wax-melting equipment, hair curlers, beard trimmers, bathroom-scales, televisions, radios etc. The primary coil may be concealed behind a facing layer 2015 of the bathroom surface, such as a ceramic sink surround or wall tile. The primary coil may also be incorporated in the wall or door of a bathroom cabinet, behind a vinyl or Formica surface layer, for example. Similarly, a primary coil may be concealed beneath or within the floor such as under or within a rug, fitted carpet, parquet, linoleum, floor tiles, tiling, paving and the like, enabling an appliance to be placed on the floor and operated without being plugged in by a visible power cord. Indeed, the primary coil may be incorporated within a sink or bathtub, whether ceramic or acrylic.

Figure 12B:
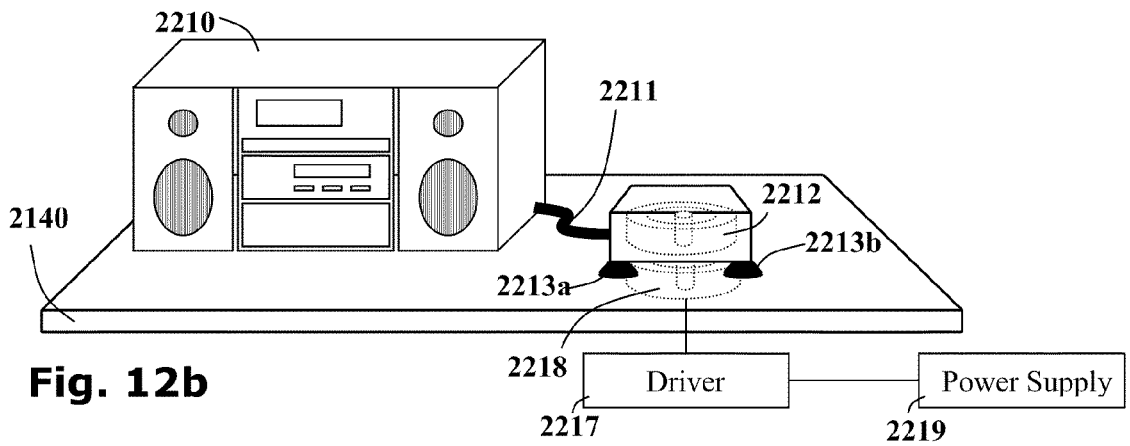

FIG. 12*b* is a schematic representation of an electrical appliance 2210 having a secondary coil 2212 connected therewith via a flex 2211, with a vacuum sucker arrangement 2213 for attaching the secondary coil 2212 to a surface 2026, over a primary coil 2218 therewithin. The primary coil 2218 is connected to a power supply 2219 via a driver 2217.

It will be appreciated that preferably bathroom surfaces are smooth, enabling them to be easily wiped clean. This feature enables suckers 2213 to be used to temporarily attach lightweight objects to bathroom surfaces 2216. Optionally, one or more suckers 2213 are provided in proximity with the secondary coil 2212, for attaching the secondary coil 2212 over the primary coil 2218.

Figure 12C:
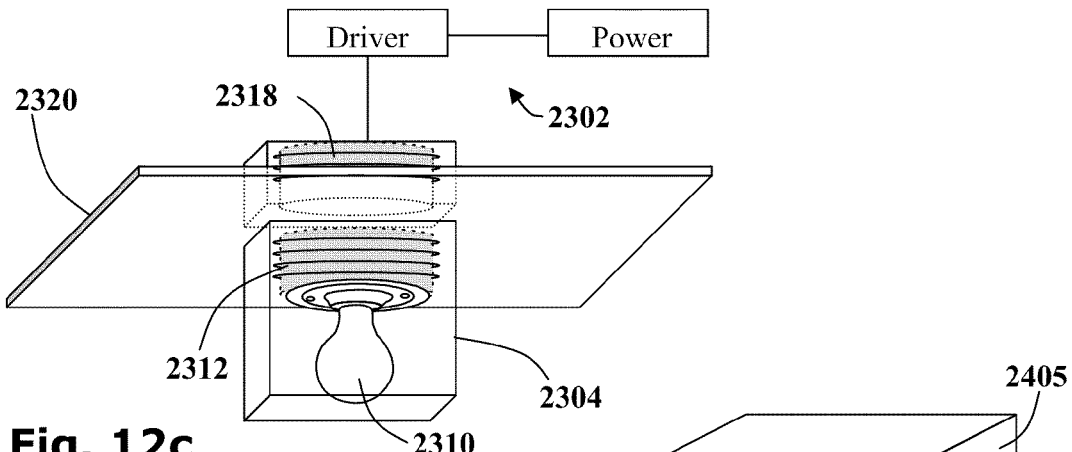

With reference to FIG. 12*c*, occasionally shower jets are inadvertently directed at light fittings 2310. Where such light fittings are mains powered, this could result in electrocution, and bathroom light fittings should be fully enclosed. It will be appreciated that light fittings 2310 in accordance with embodiments of the present invention may be fully insulated from the power source 2302 by a dielectric material 2304, and provided with a secondary coil 2312. The primary coil 2318 may be incorporated within green, i.e. water-proof plasterboard 2320, for example. Thus an alternative, safe approach to providing light in the bathroom is provided.

Figure 12D:
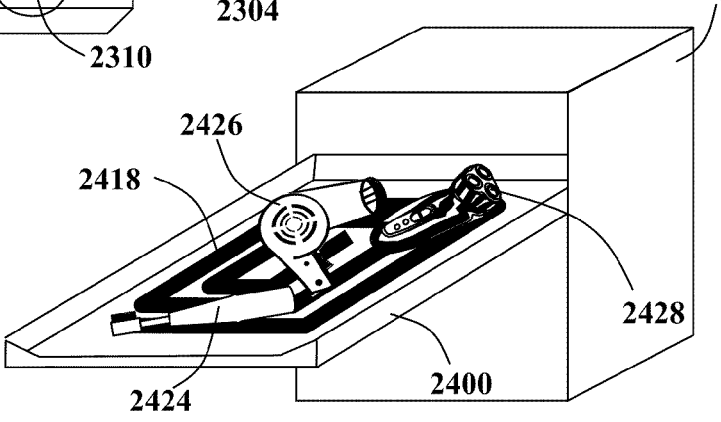

With reference to FIG. 12*d*, a drawer 2400 in a bathroom cabinet 2405 is shown. Drawer 2400 is provided with one or more primary coils 2418. Indeed, the base 2404 thereof may be covered with one large rectangular primary coil 2418 coupled to a mains power supply (not shown). A plurality of rechargeable appliances such as electrical toothbrushes 2424, hair dryers 2426 and shavers 2428 may be recharged by providing the appliances with secondary coils (not shown) and placing them within the drawer 2400.

Figure 12E:
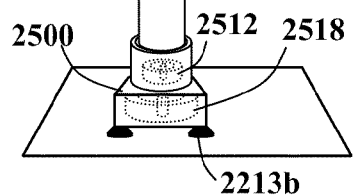

With reference to FIG. 12*e*, additionally or alternatively, a dedicated stand 2500 may be provided, with dedicated primary coils 2518 thereon for recharging specific appliances. For example, a toothbrush holder 2500 with a primary coil 2518 therein may be provided for recharging one or more electrical toothbrushes 2524 storable therewithin, via a secondary coil 2512 thereupon.

Figure 12F:
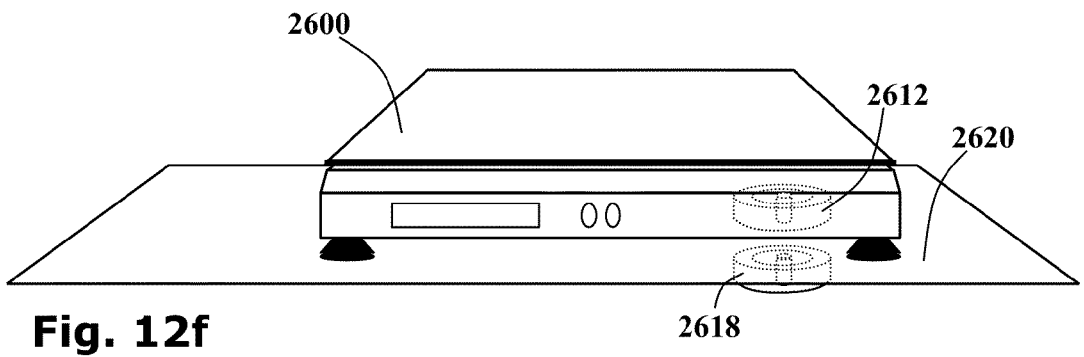

With reference to FIG. 12*f*, a digital bathroom scales 2600 with a secondary coil 2612 therebeneath may be positioned over a primary coil 2618 embedded in the floor 2620, or placed under a bathmat (not shown).

Thus some embodiments of the present invention do away with conventional power outlet sockets in the bathroom, which are difficult to clean and have an inherent risk of electrocution.

Certain appliances, such a refrigerators, freezers, stoves and dishwashers are power hungry, large devices that tend to be plugged into dedicated sockets, and are rarely moved, apart from to allow cleaning of the space thereunder and therebehind. Such devices are well served by conventional, conductive power technology.

Many other domestic kitchen appliances and gadgets, such as egg beaters, bread-makers, liquidizers, orange juice extractors, vegetable juicers, food-processors, electric knives, toasters, domestic sterilizers sandwich toasters, popcorn makers, magnetic stirrers, waffle makers, electrical barbecue grills, slow cookers, hot-plates, deep-fat fryers, electrical frying pans, knife sharpeners, electrical tin-openers and the like, are used occasionally, and preferably stored in cupboards when not in use, to keep work-surfaces available for the job in hand.

Ideally, such devices should be usable on any available work surface, including the draining board by the sink, countertops, table top and the like. The well designed kitchen of the prior art has double power outlet sockets set into the walls above all such work-surfaces, enabling such occasionally used devices to be plugged in and used where desired.

Kitchens, which are used for the preparation of food for human consumption, should be kept hygienically clean. Walls are often tiled with ceramic tiles and counter tops are typically fabricated from polished stone, stainless steel, or Formica, to provide an easily cleaned surface that may be repeatedly washed. It will be appreciated that power outlet sockets, are less easily cleaned than such work-surfaces, since the socket holes for plug pins, and switches must be kept dry to prevent short circuits, or worse, electrocution.

Kettles are particularly problematic, as they need to be regularly refilled from the tap (faucet). For safe usage, the kettle should be disconnected from the electric power supply, and in properly designed kitchens, sockets are not located close to sinks, and kettle wires are kept short. To avoid bringing the cord with plug attached to the sink, which is hazardous, the cords of kettles can usually be disconnected at the point of connection to the kettle. Should this point of connection get wet however, there is a real danger of short-circuiting and blowing or tripping a fuse, which is inconvenient, and also prevents a real danger of electrocution which is rather more serious.

For some applications, these issues may be addressed by battery powered appliances, having disposable or rechargeable batteries. However, disposable batteries are expensive and ecologically damaging. Neither disposable nor rechargeable batteries are particularly reliable in that they seem to run out of power in the middle of tasks, and for high power requiring devices such as kettles and deep fat fryers, battery power is not a practical option.

With reference to FIG. 13*a*, a schematic representation is shown of an electrical appliance 3120, specifically, a toaster. Instead of having a plug on a flex for plugging into a power outlet socket as with conventional appliances, a secondary coil 3124 is provided in the base 3122 thereof. The electrical appliance 3120 may be powered by placing it on a work surface 3140 incorporating a primary inductive coil 3144, so that the secondary coil 3124 is aligned with the primary coil 3144.

It will be appreciated that although a toaster is described herein by way of an example, the electrical appliance 3120 may be any of a wide range of appliances or gadgets such as egg beaters, bread-makers, liquidizers, orange juice extractors, vegetable juicers, food-processors, electric knives, sandwich toasters, waffle makers, electrical barbecue grills, slow cookers, hot-plates, deep-fat fryers, electrical frying pans, knife sharpeners and domestic sterilizers, kettles, urns, radios, cassette players, CD players and electrical tin-openers.

The primary coil 3144 is wired to a power supply 3160 via a driver 3180 which provides the electronics necessary to drive the primary coil 3144. Driving electronics may include a switching unit providing a high frequency oscillating voltage supply, for example.

The primary coil 3144 may be concealed behind a facing layer 3142 of the kitchen work-top, or table. The facing layer may be a sheet of sticky back plastic, vinyl, Formica or wood veneer, for example. Similarly, a primary coil may be concealed beneath or within the floor such as under or within a rug, fitted carpet, parquet, linoleum, floor tiles, tiling, paving and the like, enabling the domestic appliance to be placed on the floor and operated.

In a preferred embodiment, primary coils may be placed into a resin that hardens as artificial marble, which is a polymer matrix composite including mineral filler, such as solid surface building materials, for example Corian® or the so-called, Caesar® Stone, manufactured in Israel. Caesar® stone may be cast with sinks and drainers built in. Unlike real stone that needs drilling from behind to provide a primary inductive coil near the upper surface thereof, where desired, Caesar stone and similar composite materials, including concrete, may be cast around inclusions such as metal objects including inductive coils and connecting wires.

FIG. 13*b* is a schematic representation of an exemplary electrical appliance 3120, again represented by a toaster, having a secondary coil 3124 connected therewith via a flex 3126, with a vacuum sucker arrangement 3128 for attaching the secondary coil 3124 to a work-surface 3140, over a primary coil 3144 therewithin.

As with the embodiment of FIG. 13a, the primary coil 3144 may be incorporated within a horizontal surface 3140, such as a kitchen worktop. Alternatively, the primary coil may be concealed behind or within a vertical surface such as a wall of a building or a cabinet, for example within ceramic wall tiles, behind wallpaper behind a Formica cupboard door or wall, or the like.

Preferably, kitchen surfaces are smooth, enabling them to be easily wiped clean. This feature enables suckers to be used to temporarily attach lightweight objects to kitchen surfaces. Optionally, one or more suckers 3129 are provided for attaching the secondary coil over the primary coil.

The appliances of FIGS. 13a and 13b may additionally include a socket 3128 for connecting a power cable for conductive power supply, by plugging into a conventional, conductive mains power socket.

Alternatively, as shown in FIG. 13c, a retractable cord 3123 that is coilable within the base 3122 of the appliance 3120c is provided. Furthermore, as shown in FIG. 13c, but equally applicable to appliances 3120a and 3120b of FIGS. 13a and 13b, a power storage means 3125 may be provided, for storing power, enabling the device to be charged and used where no inductive or conductive power is available. This makes appliances in accordance with the invention, truly portable, and usable on any work surface.

Now, generally lead acid accumulators such as used in cars, are designed to produce a high current burst, whereas rechargeable batteries are essentially designed for powering electronic devices such as mobile phones and laptop computers over extensive periods of time. Embodiments of the present invention are directed to appliances including capacitors or electrochemical power storage devices designed to provide appropriate power to power electrical motors for a number of seconds to two or three minutes, and are thus appropriate for powering food processors, toasters, kettles, and the like.

With reference to FIG. 13d, a storage area 3000, such as a drawer or cupboard having primary charging coils 3121 in the base thereof is shown. Appliances with a chargeable component 3125 (FIG. 13c) may be stored in storage area 3000, for removal therefrom and use. In this way the chargeable component 3125 is fully charged when needed.

Figure 14A:
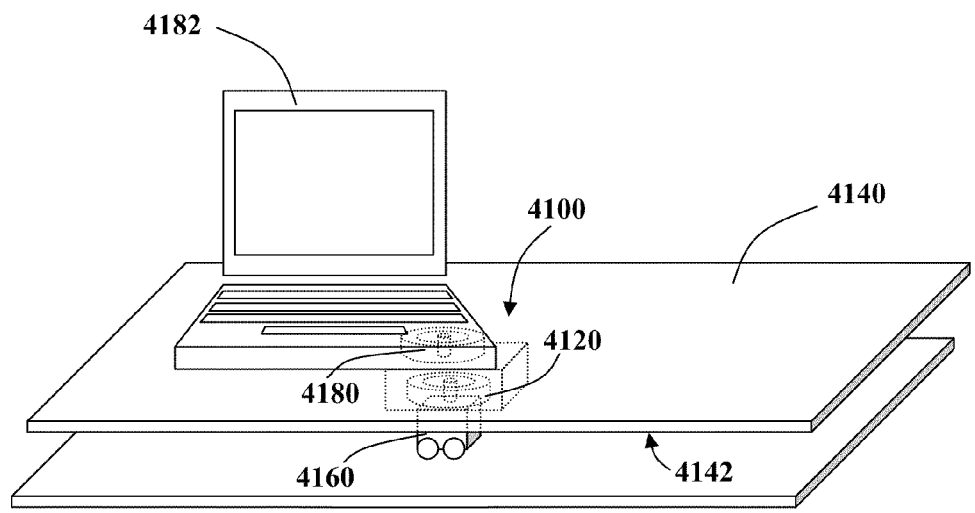
FIG. 14a is a schematic representation of a surface incorporating a movable power outlet, with a portable computer inductively coupled therewith according to another embodiment of the current invention.

In the power providing systems above described, the power outlets are generally fixed in predetermined locations. According to other embodiments of the present invention, the power outlets are movable to suit changing requirements. With reference to FIG. 14a, a movable power outlet 4100, according to another embodiment of the present invention is shown, for providing power to an electrical device, specifically a computer 4182. A primary coil 4120, adjacent to the back face 4142 of a surface layer 4140, is affixed to a positioning mechanism 4160. The primary coil 4120 is configured to inductively couple with a secondary coil 4180 wired to the computer 4182. The positioning mechanism 4160 is configured to move the primary coil 4120 behind the surface layer 4140 so that the primary coil 4120 may be repositioned.

The primary coil 4120 is wired to a power source typically via a controller (not shown) providing the electronics necessary to drive the primary coil 4120. Driving electronics may include a switching unit, providing a high frequency oscillating voltage supply, for example.

In some embodiments of the invention, the power outlet 4100 may be incorporated into a vertical surface such as a wall of a building or a cabinet. The primary coil 4120 may be moved behind a surface layer 4140 of wall paper or stretched canvas for example. Alternatively the power outlet 4100 may be incorporated behind a facing layer of a horizontal platform such as a desk-top, a kitchen work-top, a conference table or a work bench for example of mica, Formica or wood veneer. In other embodiments the primary coils 4120 are configured to move beneath flooring such as rugs, fitted carpet, parquet, linoleum, floor tiles, tiling, paving and the like.

Figure 14B:
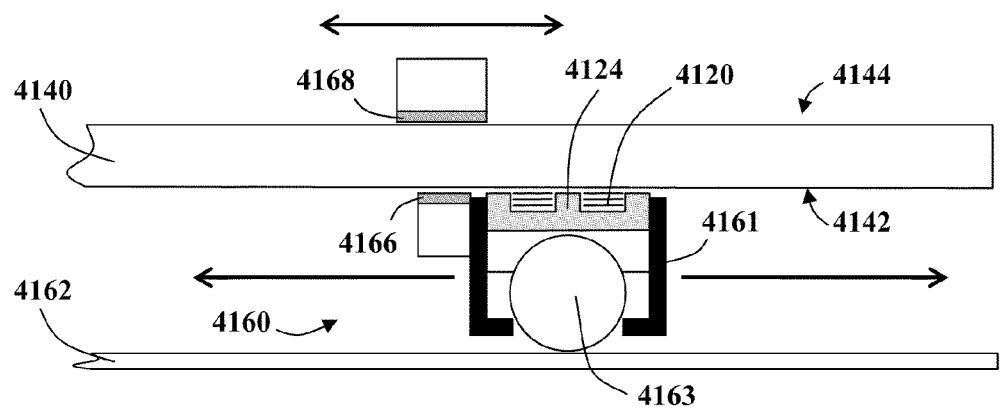
FIG. 14b is a cross section through a surface layer behind which a power outlet is mounted upon a first embodiment of a positioning mechanism.

Referring now to FIG. 14b, according to a first embodiment of the positioning mechanism 4160, the primary coil 4120 is sandwiched between the surface layer 4140 and a base layer 4162. The primary coil 4120 is affixed to a carriage 4161, mounted upon a roller-ball 4163 and is configured to roll over the base layer 4162. A magnetic element 4166, such as iron, steel or preferably a permanent magnet, is affixed to the carriage 4161. The magnetic element 4166 is configured to be pulled by a nearby attracting magnetic element 4168 situated upon the front face 4144 of the surface layer 4140. Moving the attracting magnetic element 4168 across the plane of the surface 4140 drags the magnetic element 4166, thereby dragging the primary coil 4120 beneath the surface layer 4140 and positioning it as required.

It will be appreciated that instead of the roller-ball 4163, the carriage 4161 may be mounted upon other elements such as wheels, skis, levitating magnetic elements or the like. Where applicable, movement of the positioning mechanism 4160 may further be assisted by coating abutting surfaces with low-friction materials, such as Teflon® (PTFE).

Figure 15A:
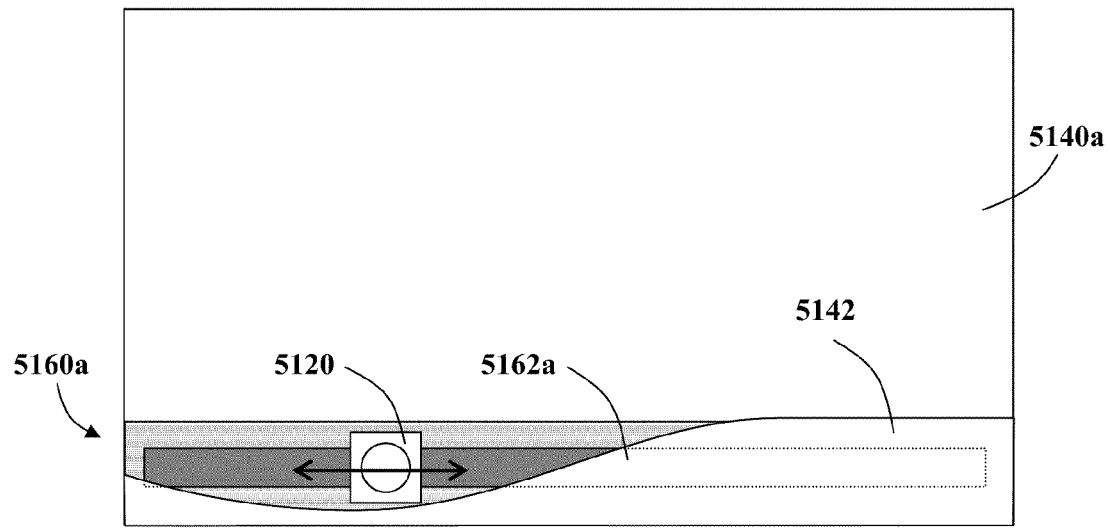
FIG. 15a is a schematic representation of a wall including a linear rail behind the skirting board thereof to which a power outlet is slidably mounted and free to be moved by a second embodiment of a positioning mechanism.

In a second embodiment of the positioning mechanism 5160, as shown in FIG. 15a, a primary coil unit 5120 is slidably mounted to a rail 5162. The rail 5162 may run horizontally behind the skirting board 5141 of a wall 5140 for example. The primary coil unit 5120 is configured to be movable into various positions along the rail 5162. The primary coil unit 5120 may be pulled manually by magnets as in the embodiment of FIG. 15a. Alternatively the primary coil unit 5120 may be mounted upon motorized wheels 5164 and configured to drive itself along the rail 5162.

Figure 15B:
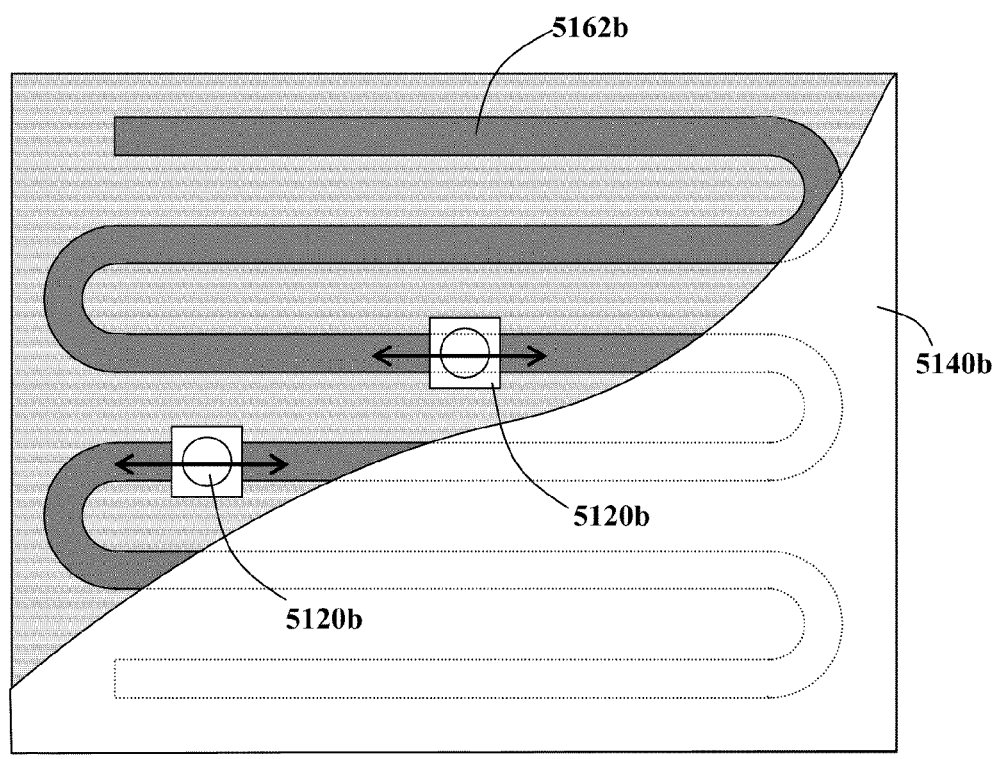
FIG. 15b is a schematic representation of two power outlets slidably mounted to an extended rail covering a wall.

It will be appreciated that the rail 5162 may be straight or curved and may even snake back and forth to cover an extended area of the wall 5140, as shown in FIG. 15b. According to still other embodiments, more than one primary coil units 5120b may be independently positionable. Alternatively a plurality of primary coil units may all be moved together.

Figure 15C:
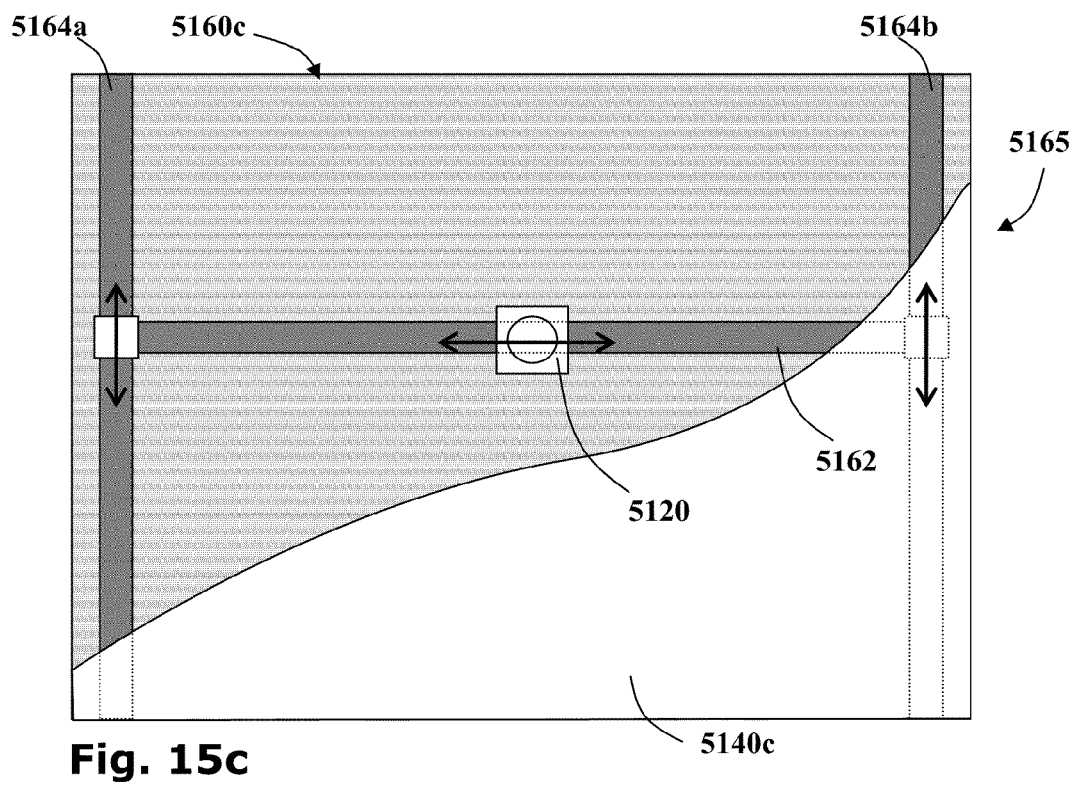
FIG. 15c is a schematic representation of a third embodiment of a positioning mechanism wherein a power outlet is mounted upon an adjustable H-frame behind a wall.

Reference is now made to FIG. 15c showing a third embodiment of the positioning mechanism 5160c in which a primary coil unit 5120 is slidably mounted to a boom rail 5162, which is slidably supported by a pair of generally perpendicular supporting tracks 5164 to form an adjustable H frame 5165. Thus the position of the primary coil unit 5120 may be moved behind a surface layer 5140.

It will be appreciated that in embodiments where the positioning mechanism 5160 is orientated vertically, behind a vertical surface layer 5140 such as a wall say, the supporting tracks 5164 may be replaced by supporting pulleys. Such pulleys may be used to support the boom rail 5162 which may be lowered and raised by adjusting the pulleys either manually or by a driving motor. Alternatively, the primary coil unit 5120 may be suspended from a pulley mounted to trolley configured to run horizontally along a fixed gantry beam spanning the width of the wall.

Figure 15D:
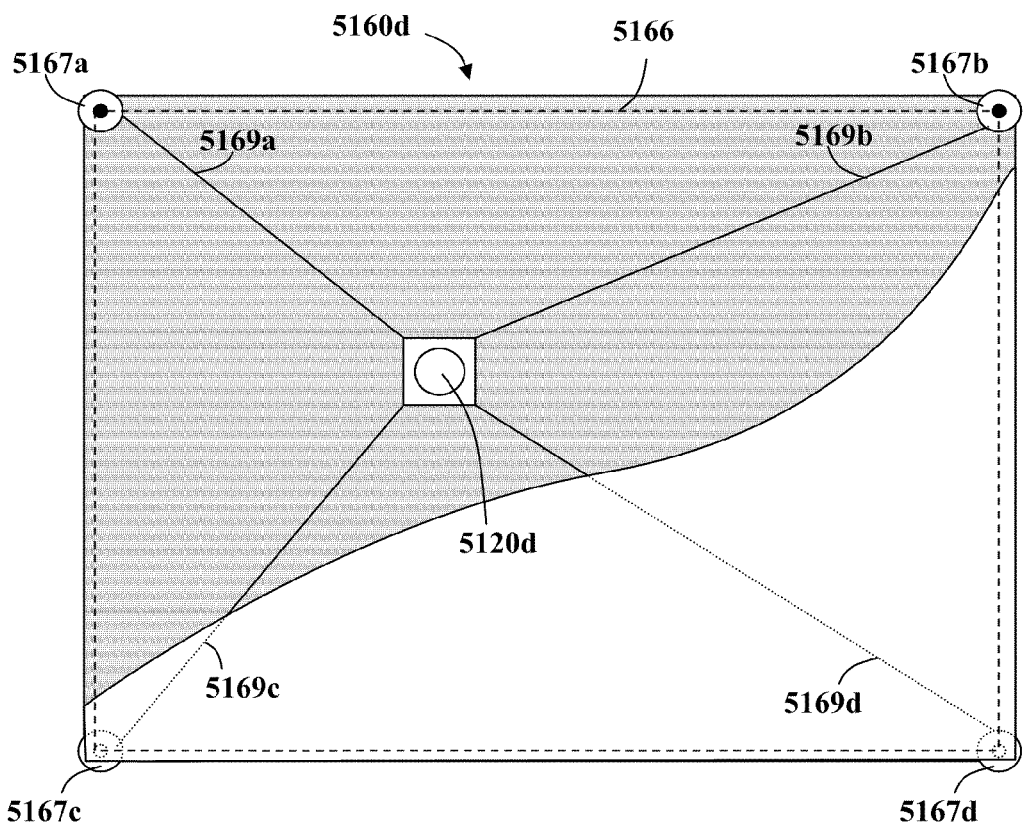
FIG. 15d is a schematic representation of a fourth embodiment of a positioning mechanism wherein a power outlet is movable by four guiding cables behind a surface.

According to a fourth embodiment of the positioning mechanism 5160d, as shown in FIG. 15d, a primary coil unit 5120d is affixed to four guiding cables 5169a-d. The lengths of the guiding cables 5169a-d are independently controlled by pulleys 5167a-d, located at four points defining the corners of a quadrilateral 5166. The position of the primary coil unit 5120 may be manipulated by the pulleys 5167 into any position within the quadrilateral 5166. It will be apparent that other configurations of three or more pulleys may be used to manipulate the primary coil unit 5120*d* over two dimensions and two or even one pulley may be used to manipulate a primary coil unit along a line.

Figure 16A:
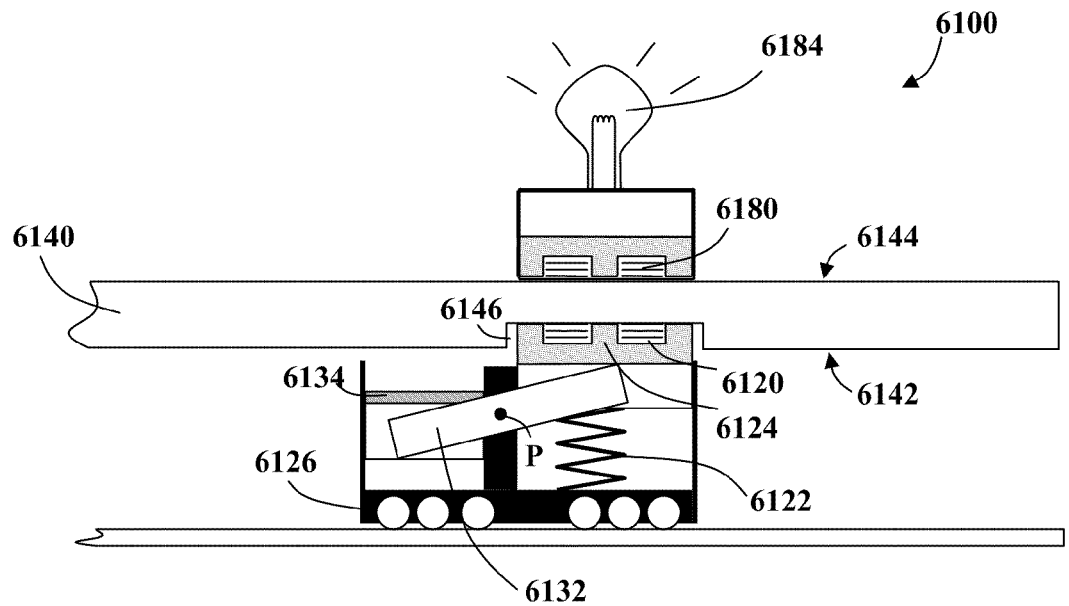
FIGS. 16a and 16b show sections through a movable inductive outlet including a clutch mechanism engaged and disengaged to the surface.

Referring now to FIG. 16*a*, in a further embodiment of the invention, the primary coil 6120 is adjacent to the back face 6142 of the surface layer 6140 and is configured to inductively couple with a secondary coil 6180 located upon the front face 6142 of the surface layer 6140. The secondary coil 6180 may be wired to an electrical device such as a light bulb 6184 for example.

In order to maximize the inductive coupling between the primary coil 6120 and the secondary coil 6180, the gap between them should be minimal. Therefore the primary coil 6120 is preferably pressed tightly against the back face 6142 of the surface layer 6140. A clutch may be provided, such as a compressed helical spring 6122 for example, which urges the primary coil 6120 towards the back face 6142. Optionally, recesses may be cut into the back plate 6142, providing bays 6146 therein, wherein the thickness of the surface layer 6140 is reduced. The primary coil 6120 may be docked at one of these bays 6146 for efficient inductive coupling by minimizing the thickness of the dielectric layer between primary 6120 and secondary coil 6180. A flux guidance core 6124, for example comprising ferromagnetic material such as ferrite, may be incorporated into the primary coil 6120, the secondary coil 6180 or even within the surface layer 6140 to optimize the inductive coupling.

Pressing the primary coil 6120 against the back face 6142, however, increases the friction between them and may impede the movement of the primary coil 6120. Therefore, a releasing mechanism 6130 may be provided to disengage the primary coil 6120 from the back face 6142. According to one embodiment of the release mechanism 6130, the primary coil 6120 is affixed to the distal end of a lever 6132 which is configured to pivot about a point P connected to a carriage 6126. A first attractive magnetic element such as a permanent magnet 6134 is affixed to the proximal end of the lever 6132 and situated close to the back face 6142 of the surface layer 6140.

Figure 16B:
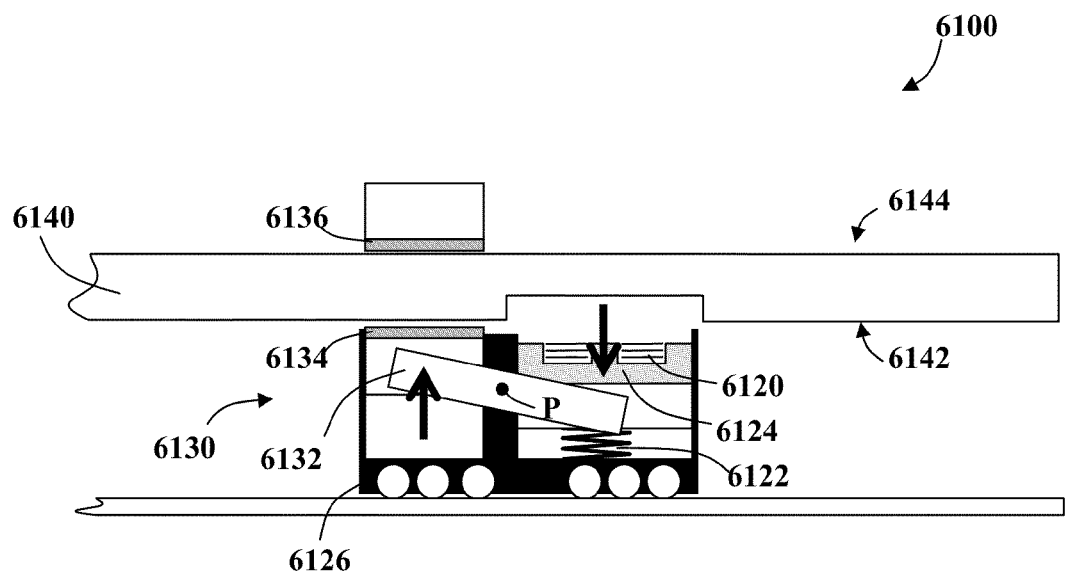

As shown in FIG. 16*b*, the release mechanism 6130 is configured such that a second magnetic element 6136, which may be adjacent to the front face 6144 of the surface layer 6140, may be brought into proximity with the first magnetic element 6134. The first magnetic element 6134 is attracted towards the back surface 6142 by the second magnetic element 6136. The lever 6132 pivots about point P, compressing the spring 6122 and disengaging the primary coil 6120 from the back face 6142 of the surface layer 6140. The carriage 6126 is then free to carry the primary coil 6120 to a new position as required. It is noted that the first magnetic element 6134 and second magnetic element 6136 may also provide a positioning mechanism 6160 as described in the embodiment of FIG. 14*b*.

It will be appreciated that, for automated systems, a preferred embodiment of the release mechanism 6130 may include electromagnets mounted to the carriage 6126 behind the surface layer 6140. The electromagnets may be used to disengage the primary coil 6120 from the back face 6142 thereby serving the function of the magnetic elements 6134, 6136 described above.

By not requiring holes for coupling pins, the inductive power outlets described above may be disguised effectively and are less obtrusive than conventional power outlets. Generally, the fact that socketless outlets are less obtrusive is advantageous. However, being harder to spot than conventional power outlets has its disadvantages presenting new problems to be solved. Notably, the user must somehow locate the concealed outlet before being able to use it.

Figure 17A:
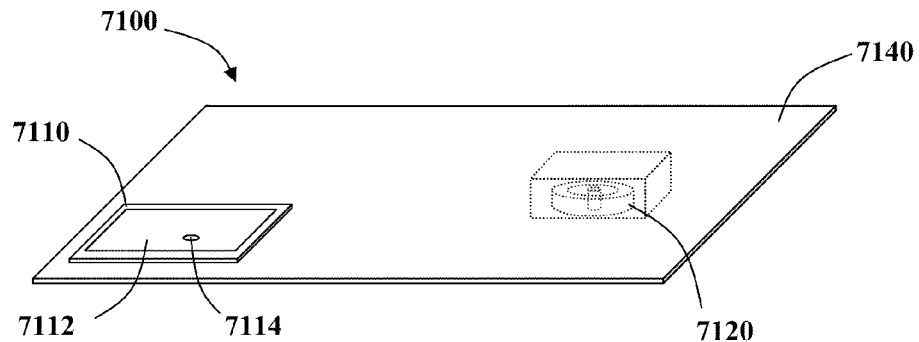
FIG. 17a is a schematic representation of a concealed power outlet and an indicator incorporated into a surface for indicating the location of a primary coil concealed behind the surface.

The problem of locating such sockets is particularly acute where the power outlets are behind a concealing surface such as a desk top or wall, and mounted upon positioning mechanisms as described above. Where the position of a power outlet is adjustable by being mounted on a track or arm, within a wall cavity or hollow work surface, and where the surface is opaque, it is not possible to indicate the position of such power outlets by making indicative marks on the concealing surface. With reference to FIG. 17*a* a locatable power outlet 7100 is shown in accordance with another embodiment of the invention. The locatable power outlet 7100 includes a visual display 7110 that may be incorporated into a surface 7140 such as a wall or work surface, for indicating the location of a primary coil 7120 concealed behind the surface 7140.

The primary coil 7120 is wired to a power source typically via a controller (not shown) providing the electronics necessary to drive the primary coil 7120. Driving electronics may include a switching unit providing a high frequency oscillating voltage supply, for example.

According to certain embodiments of the invention, the power coil 7120 may be concealed behind a vertical surface such as a wall of a building or a cabinet. The primary coil 7120 may be concealed behind a surface 7140 of wall paper or stretched canvas for example. Alternatively the primary coil 7120 may be concealed behind a facing layer of a horizontal platform such as a desk-top, a kitchen work-top, a conference table or a work bench for example of mica, Formica or wood veneer. In other embodiments a primary coil 7120 is concealed beneath flooring such as rugs, fitted carpet, parquet, linoleum, floor tiles, tiling, paving and the like.

Figure 17B:
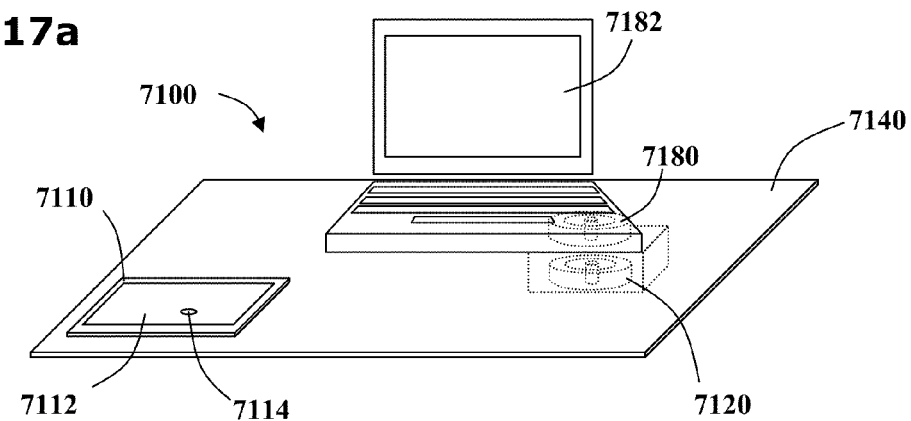
FIG. 17b is a schematic representation of a computer resting upon the surface of FIG. 17a and being powered by the concealed primary coil.

It will be apparent that when the location of the primary coil 7120 is known, a secondary coil 7180 may be brought into alignment with it, as shown in FIG. 17*b*. When so aligned, the primary coil 7120 may inductively couple with the secondary coil 7180, thereby powering an electrical device, such as a computer 7182, wired to the secondary coil 7180.

In one embodiment, the location of a concealed primary coil 7120 is indicated to the user by a visual display 7110 incorporated within the surface 7140. The visual display 7110 displays a map 7112 of the surface 7140 upon which the location 7114 of the primary coil 7120 is indicated.

Figure 17C:
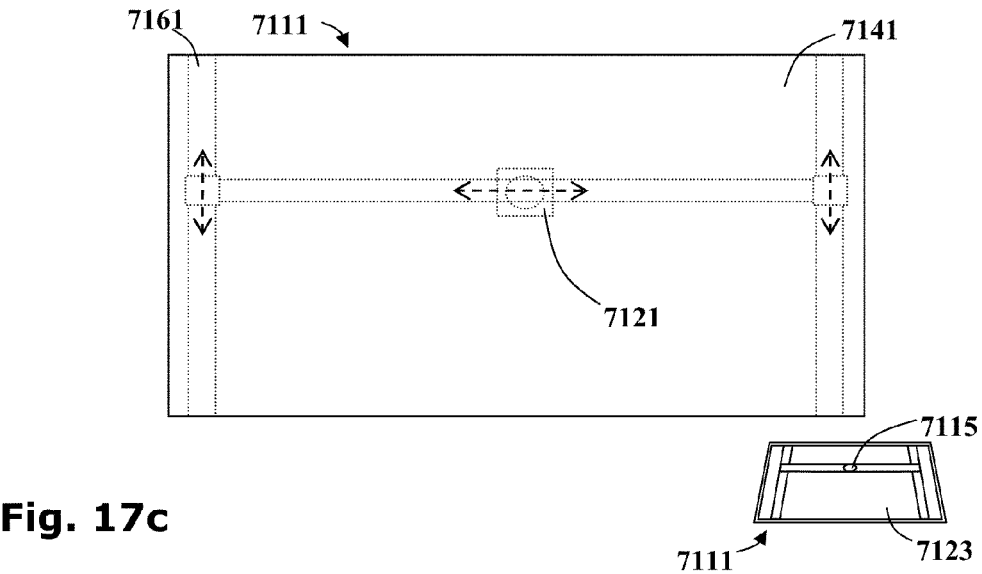
FIG. 17c is a schematic representation of an alternative power outlet, wherein an adjustable primary coil is concealed behind a wall and controllable remotely by a control panel which indicates the location of the primary coil.

Referring now to FIG. 17*c*, which schematically shows a power outlet 7101 according to another embodiment of the invention, comprising an adjustable primary coil 7121, mounted upon an adjustable H-frame 7161 and concealed behind a wall. The adjustable primary coil 7121 is controllable remotely from a control panel 7111 and the location of the adjustable primary coil 7121 is indicated by the position of a marker 7125 upon a map 7123 represented upon a control panel 7111.

It will be appreciated that a control panel 7111 may be a touch screen upon which the marker 7125 is a cursor which may be moved about a virtual map to control a positioning mechanism. The marker 7125 therefore both indicates and adjusts the location of the primary coil 7121. Alternatively, the control panel 7111 may be a movable mechanical switch, the position of which indicates the location of the concealed primary coil 7121. Although an adjustable H-frame 7161 is represented here, it will be apparent that other positioning mechanisms may be applicable.

Figure 18A:
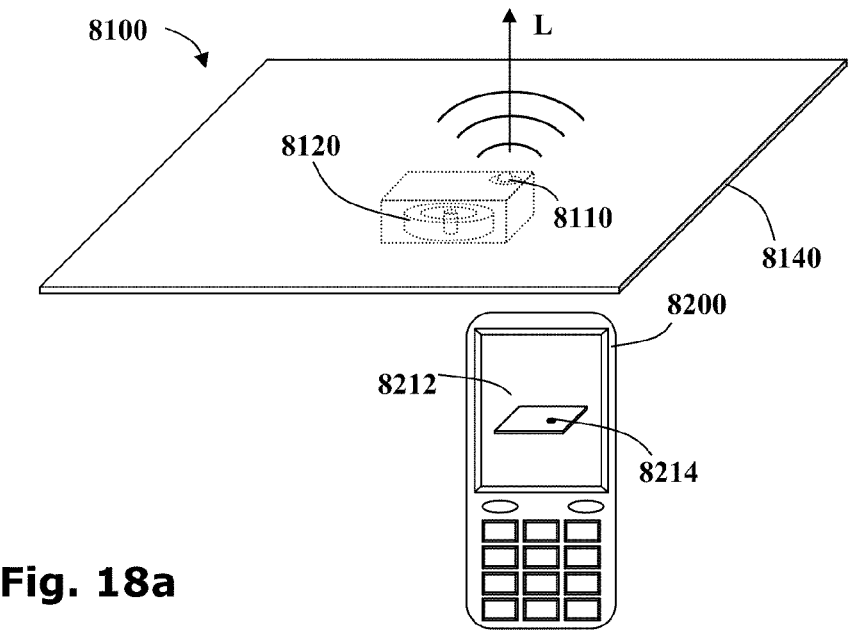
FIG. 18a is a schematic representation of a power outlet, wherein a light emitting diode transmits a location beam which is received by a camera of a mobile phone.

With reference now to FIG. 18a a schematic representation is shown of a power outlet 8100 according to yet another embodiment of the invention. Power outlet 8100 includes a concealed primary coil 8120 that incorporates a transmitter, such as a light emitting diode 8110. A locator beam L is transmitted by the light emitting diode 8110 to indicate the position of the primary coil 8120. The surface 8140 is translucent to the wavelength emitted by the LED and thus the locator beam L may be detected by a photodiode responsive to the wavelength. It has been found that Infra Red radiation emitted by an LED behind a 0.8 mm Formica sheet may be detected by standard digital cameras including digital cameras of the type incorporated in many modern mobile phones 8200, for example.

It is noted that thin layers 8140 of many materials such as plastic, cardboard, Formica or paper sheet, are transparent to infra-red light. Although a light emitting diode 8110 transmitting light in the infra-red region of the electromagnetic spectrum is invisible to the human eye, it is readily detectable by digital cameras and, if such an infra red light emitting diode is incorporated into a primary coil 8120, a standard mobile phone 8200 equipped with a digital camera may serve as a detector to locate the primary coil 8120. It will be appreciated, however, that a suitably powerful visible light emitter can be used enabling detection by the naked eye, provided that the covering material selected is transparent/translucent to the specific wavelength at the emission intensity of the emitter and the thickness of the covering layer 8140.

It will be appreciated that appropriate detectors may be selected and specified for detecting specific electromagnetic wavelengths, including ultra-violet radiation, micro waves, radio waves or even x-ray or shorter wavelengths and thus as long as embedded electromagnetic signal emitter and detector are considered together, there are a very large number of essentially equivalent solutions to this problem. Furthermore, transmitters configured to transmit other types of radiation, including mechanical vibrations such as both audible and inaudible (e.g. ultrasonic) sound waves, could be used for locating the concealed primary coil with the appropriate, corresponding detection means.

Figure 18B:
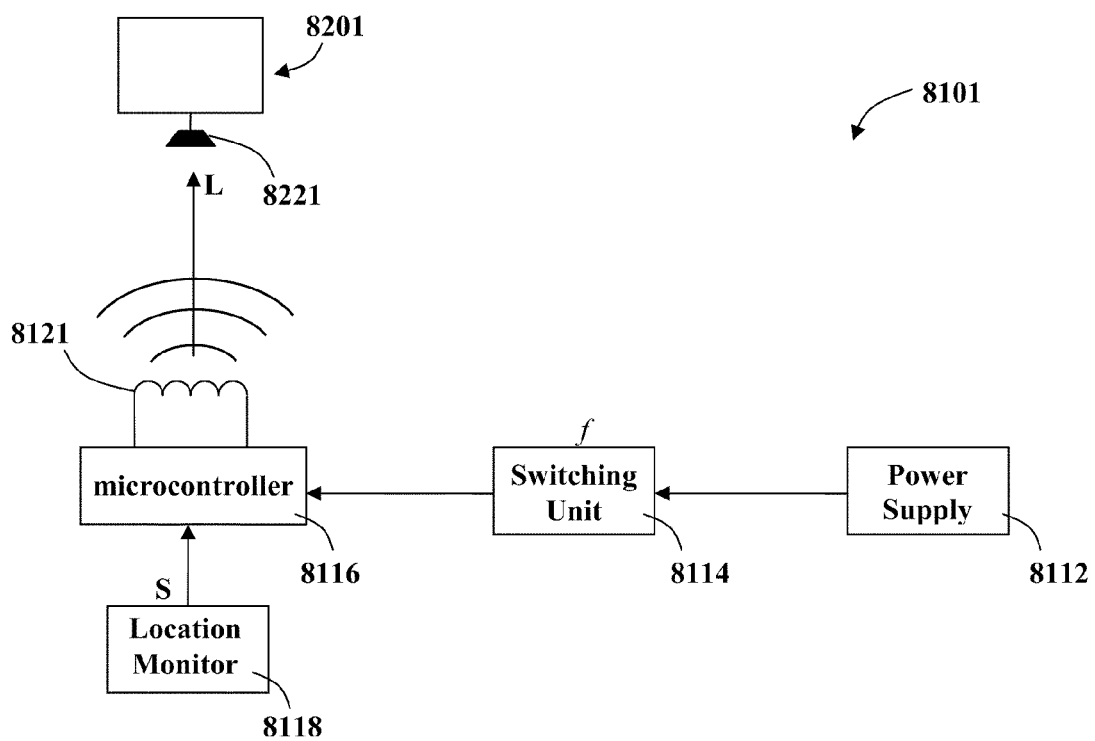
FIG. 18b is a block diagram representing a power outlet according to another embodiment of the invention, wherein a primary coil is configured to transmit a locator beam, carrying an encoded signal identifying the location of the primary coil, to a receiver.

Reference is now made to FIG. 18b showing a block diagram representing a power outlet 8101 according to another embodiment of the invention. A primary coil 8121 is configured to transmit a locator beam L which carries an encoded location signal S identifying the location of the primary coil 8121. A movable primary coil 8121 is connected to a power supply 8112 via a switching unit 8114 and a microcontroller 8116. The switching unit 8114 is configured to intermittently connect the power supply 8112 to the primary coil 8121 with a bit-rate frequency f. A location monitor 8118 monitors the location of the primary coil 8121 and sends a location signal S to the microcontroller 8116. The microcontroller 8116 is configured to modulate the bit-rate signal with the location signal S. The voltage applied to the primary coil 8121 may be a modulated variable voltage with a frequency f, carrying an encoded location signal S. It will be appreciated that the variable voltage may produce a radio wave of frequency f which may be transmitted as a locator beam L. Alternatively, the locator beam L may be transmitted by a dedicated transmitter, separate from the primary coil 8121.

A receiver unit 8201 that includes a receiver 8221 may be provided. The receiver 8221 may be tuned to receive the locator beam L of frequency f. The received locator beam L signal can be cross-correlated with a reference signal of frequency f to isolate the location signal S. The location of the primary coil 8121 may thereby be transmitted to a remote receiver unit 8201, which may then output the location of the primary coil unit to a display.

Although a digital bit-rate modulated locator beam L is described in the fourth embodiment hereinabove, it will be appreciated that the locator beam L may alternatively be modulated in other ways such as by analogue or digital frequency modulation or by amplitude modulation, for example.

The location monitor 8118 may monitor the location of the movable primary coil 8121 directly by keeping track of movements of the primary coil 8121 in relation to some reference points. Alternative external sensors such as proximity sensors based on infra-red sensors, ultrasonic sensors, magnetic sensors (like Hall probes), inductance sensors, capacitance sensors or the like, may be used to monitor the movement of the primary coil 8121 indirectly, by triangulation for example.

A high power inductive power outlet, when active, produces a large oscillating magnetic field. Where a secondary inductor is inductively coupled to the primary inductor, the resulting flux linkage causes power to be drawn into the secondary inductor. Where there is no secondary inductor to focus the power, the oscillating magnetic field causes high energy electromagnetic waves to be transmitted which may be harmful to bystanders. In addition, whereas in low power systems excess heat may be readily dissipated, an uncoupled high power primary coil or its surroundings may become dangerously hot.

Figure 19:
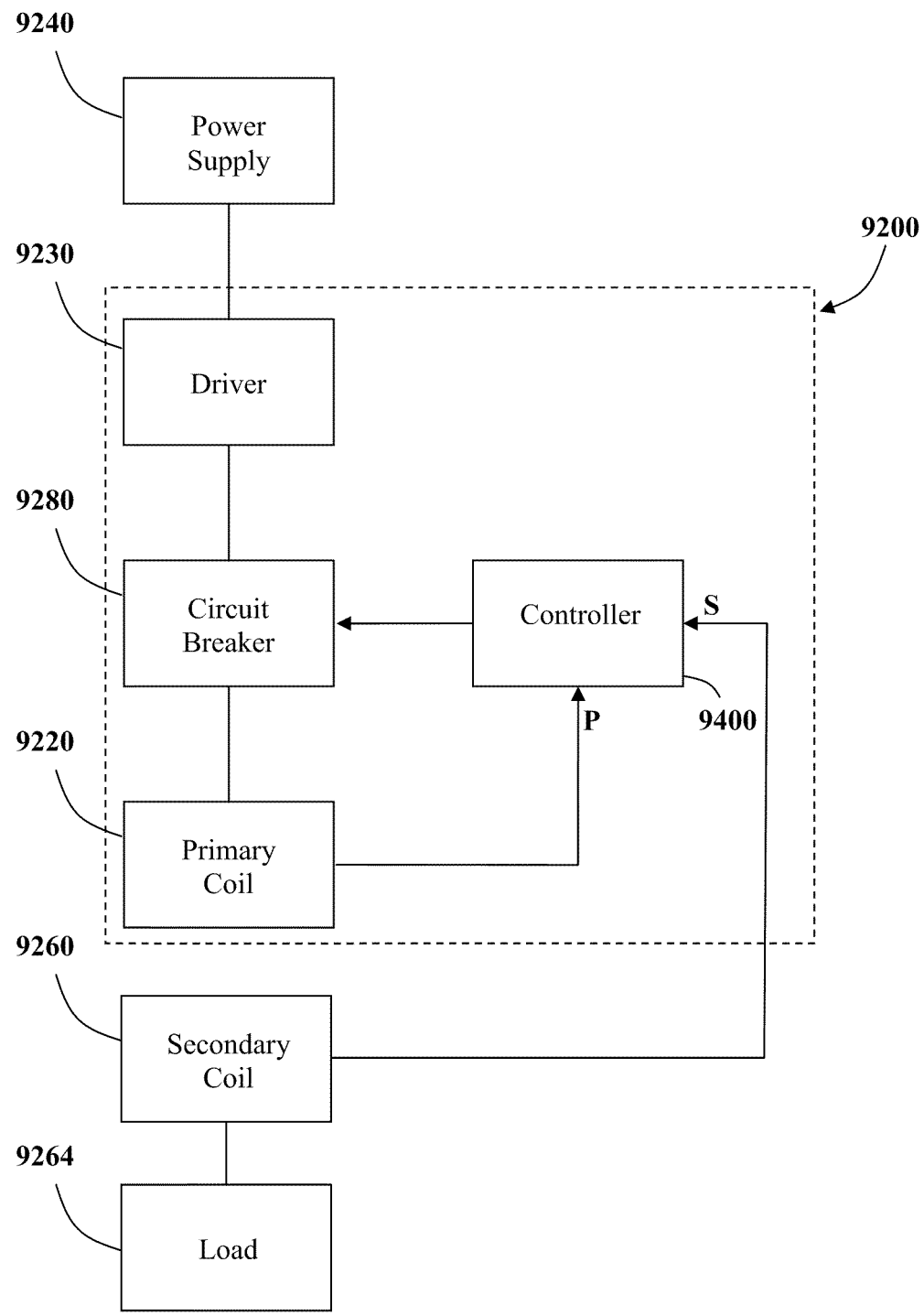
FIG. 19 is a block diagram of a power-leak prevention system for use in a power providing system according to another embodiment of the present invention.

Reference is now made to FIG. 19 showing a block diagram of a power-leak prevention system 9000 for an inductive power outlet 9200 that can be switched on and off, so that the primary coil 9220 therein produces alternating magnetic field only where a secondary coil 9260 is positioned to withdraw energy therefrom.

The inductive power outlet 9200 consists of a primary coil 9220, wired to a power supply 9240, for inductively coupling with a secondary coil 9260 wired to an electric load 9264. It is a particular feature of this embodiment of the present invention that a circuit-breaker 9280 is connected in series between the power supply and the primary coil 9220 and configured such that, when actuated, it disconnects the primary coil 9220 from the power supply 9240.

The primary coil 9220 is typically wired to a power supply 9240 via a driver 9230 which provides the electronics necessary to drive the primary coil 9220. Driving electronics may include a switching unit providing a high frequency oscillating voltage supply, for example. Where the power outlet 9200 consists of more than one primary coil 9220, the driver 9230 may additionally consist of a selector for selecting which primary coil 9220 is to be driven.

It is noted that the circuit-breaker 9280 may be connected between the driver 9230 and the primary coil 9220, in which case the circuit-breaker 9280 disconnects only the primary coil 9220. Alternatively the circuit-breaker may be connected between the power supply 9240 and driver 9230, in which case the circuit-breaker 9280 disconnects the driver 9230 itself, together with any primary coil 9220 connected thereto.

The circuit-breaker 9280 is typically controlled by a controller 9400 configured to receive a primary signal P indicating that the primary coil 9220 is transmitting power, and a secondary signal S indicating that a secondary coil 9260 is inductively coupled to the primary coil 9220 and draws power there from. The controller 9400 is typically operable to trigger the circuit-breaker 9280 thereby disconnecting the primary coil 9220 from the power supply 9240 when a primary signal P is received but no secondary signal S is received.

Figure 20A:
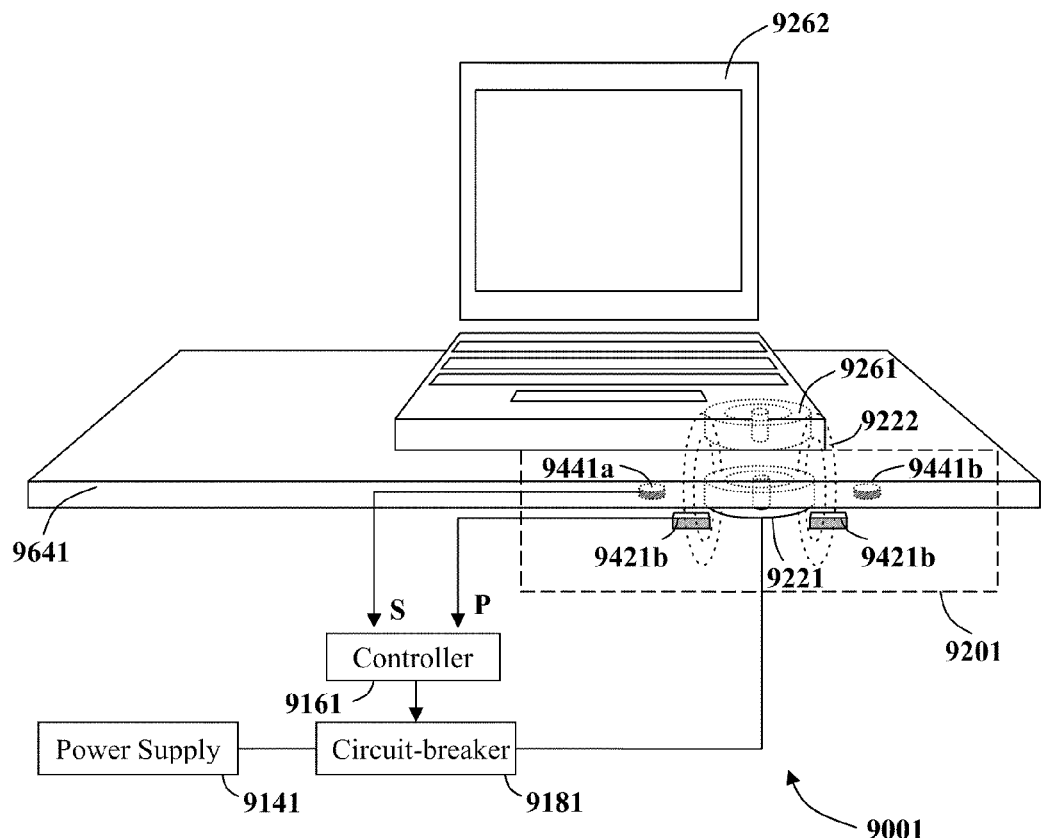
FIG. 20a is a schematic diagram of an inductive power outlet protected by a local leak prevention system, and a secondary coil, wired to an electric load, inductively coupled thereto, in accordance with another embodiment of the present invention.
Figure 20B:
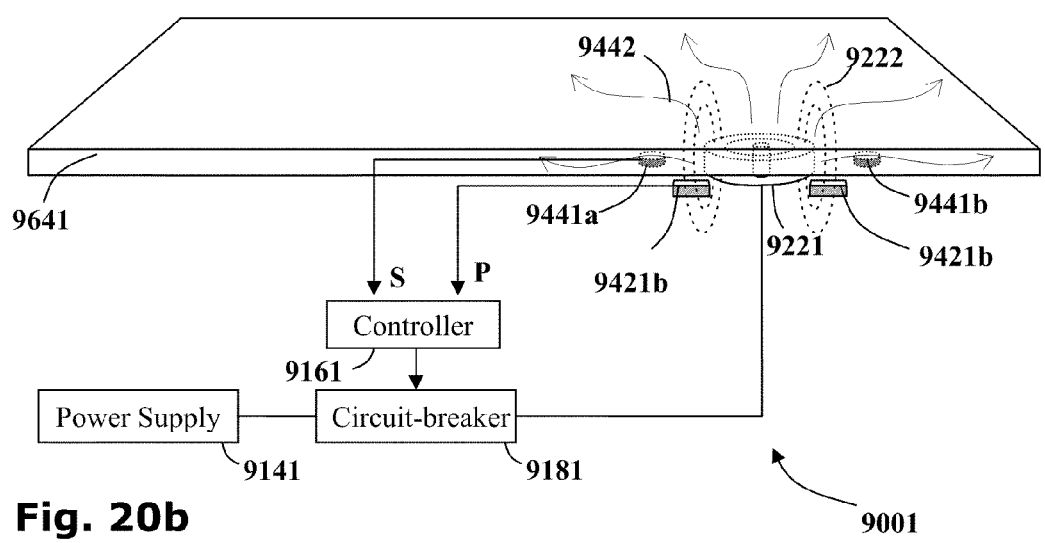
FIG. 20b is a schematic diagram of the inductive power outlet of FIG. 20a without a secondary coil inductively coupled thereto.

FIGS. 20a and 20b are schematic diagrams representing an inductive power outlet 9201 protected by a local leak prevention system 9001, according to another embodiment of the present invention. With particular reference to FIG. 20a, a primary coil 9221 may be concealed behind a facing layer of a horizontal platform 9641 such as a desk-top, a kitchen work-top, a conference table or a work bench. Such a platform may be fabricated from a wide range of materials, including mica, Formica or wood veneer, for example.

In other embodiments a primary coil 9221 may be concealed beneath or embedded within flooring materials and coverings such as rugs, fitted carpet, parquet, linoleum, floor tiles, tiling, paving and the like. Alternatively the primary coil 9221 may be embedded within or concealed behind a vertical surface such as a wall of a building or a cabinet, for example behind wallpaper or stretched canvas or the like.

The primary coil 9221 may be used to power an electrical device such as a computer 9262 wired to a secondary coil 9261; the computer 9262 being placed upon the platform 9641 such that the secondary coil 9261 coupled to the computer 9262 is aligned to the primary coil 9221 concealed within the platform 9641.

In preferred embodiments of the invention, a primary detector 9421 is located in the locality of the primary coil 9221 and is configured to detect a magnetic field generated by a primary coil 9221 actively transmitting power. The detector 9421 may function in accordance with one or more of a variety of principles, including, inter alia, magnetic sensing means Hall probes, etc. Alternatively, the detector may be a heat sensor or electromagnetic sensor configured to detect one or more scientific effects inherent to or associated with the operation of the primary coil 9221.

A secondary detector 9441 is also provided, to detect the presence or operation of the secondary coil 9261. The secondary detector 9441 may do this by detecting a signal from the secondary coil 9261 or by detecting a signal from the primary coil or from its surroundings that indicates directly or indirectly, the presence or absence of a secondary coil inductively coupled therewith.

The secondary detector may be a heat detector 9441 configured to detect a significant temperature rise in the platform 9641 in the vicinity of the primary coil 9221. Alternatively, the secondary detector may be a magnetic sensor, a Hall probe, an electromagnetic sensor, or the like, configured to detect transmissions from the secondary coil 9261.

With reference to FIG. 20a, a specific configuration is shown, such that when a secondary coil 9261 is inductively coupled to the primary coil 9221, power transmitted by the primary coil 9221 is received by the secondary coil 9261, thereby powering the electrical device 9262. Consequently, the primary detector 9421 may detect a magnetic field generated by the primary coil 9221, and send a primary signal P to a controller 9401 indicating that power is being transmitted by the primary coil 9221. Because the power is being transferred to the electrical device 9262, where the secondary detector 9441 is a temperature probe, it detects no significant temperature rise and can be configured to send a secondary signal S to a controller 9401 indicating that an electric load is inductively coupled to the primary coil 9221, or not to send a signal, thereby providing an equivalent indication, depending on the logic programming of the controller 9401.

Thus, if the controller 9401 receives a primary signal P, indicating that power is present in the primary coil 9221, and a secondary signal S, indicating that an electric load is present, it does not trigger the circuit-breaker 9281 and the primary coil 9221 continues to draw power from the power supply 9241.

When no secondary coil 9261 is inductively coupled to the primary coil 9221, as shown in FIG. 20b, power transmitted by the primary coil 9221 is dissipated throughout the platform 9641 as heat. The primary detector 9421 again detects a magnetic field generated by the primary coil 9221 and sends a primary signal P to a controller 9401 indicating that power is being transmitted by the primary coil 9221. In this case however, the secondary detector 9441 does detect a significant temperature rise due to the heat dissipated throughout the platform 9641 and so sends a secondary signal S indicating that no electric load is inductively coupled to the primary coil 9221. The controller 9401 receives the primary signal P, indicating that power is being generated, and the secondary signal S, indicating that no electric load is present, consequently the controller 9401 triggers the circuit-breaker 9281 thereby disconnecting the primary coil 9221 from the power supply 9241 and preventing any further power from being transmitted by the primary coil 9221.

Figure 21:
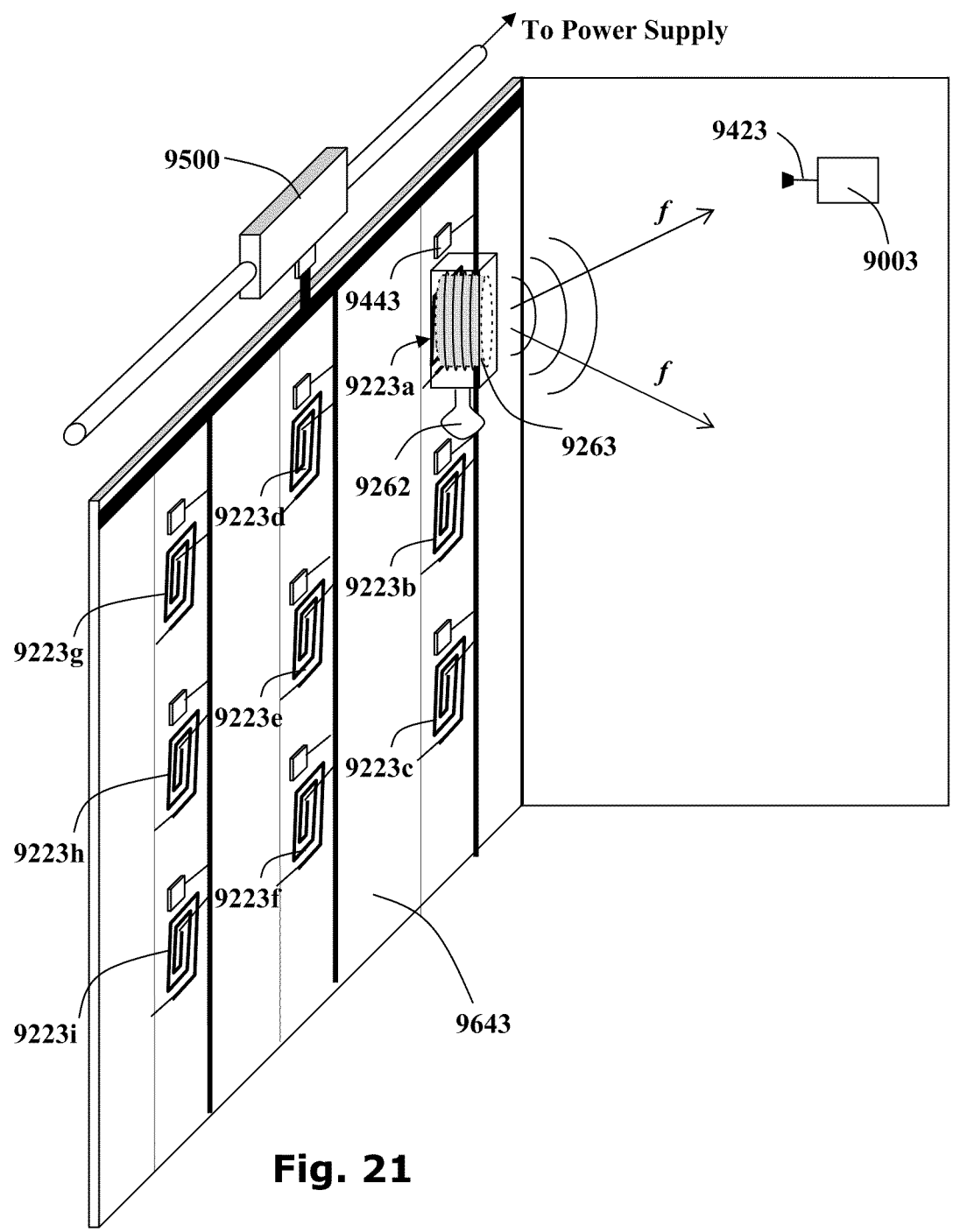
FIG. 21 is a schematic diagram of a plurality of inductive power outlets protected by a remote leak prevention system according to a further embodiment of the present invention.

Referring now to FIG. 21, a schematic diagram is presented showing a plurality of inductive power outlets 9203 protected by a remote leak prevention system 9003 according to a further embodiment of the present invention. An array of primary inductive coils 9223 are incorporated within a wall 9643 and wired to a power supply (not shown) via a driver 9233. The primary coils 9223 are arranged for inductively coupling with secondary coils 9263 wired to electrical devices, such as a light bulb 9262, which are brought into proximity with them.

When a primary coil 9223 is activated, the driver 9233 provides it with a variable voltage oscillating at a characteristic frequency f. Consequently, the primary coil 9223 transmits radio waves at a frequency of f. The remote leak prevention system 9003 includes a primary detector such as a radio receiver 9423 within range of the wall 9643, tuned to detect radio waves at the characteristic frequency f. Such radio waves indicate that at least one primary coil 9223 is transmitting.

The power outlet 9203 may additionally include a secondary detector 9443 for detecting a secondary coil 9263 inductively coupled to a primary coil 9223. The power transmission may then be modulated with a secondary tag indicating that a secondary coil 9263 is inductively coupled to the primary coil 9223.

The primary detector 9423 may then demodulate the radio waves to identify the secondary tag. If no secondary tag is detected, the primary detector 9423 will communicate a control signal C to a controller 9500 indicating that power is being transmitted by at least one primary coil 9223 in the absence of a secondary coil 9260. According to a basic embodiment, the controller 9500 is operable to then trigger a circuit breaker (not shown) thereby disconnecting all the primary coils 9223. Alternatively, the driver 9233 may additionally comprise a modulator (not shown) for tagging the power transmissions of each active primary coil 9223a-h with a primary tag uniquely identifying the active primary coil 9223a-h from which the radio waves are transmitted. The primary detector 9423 will then detect the primary tag and thereby identify which rogue primary coil is transmitting power in the absence of a secondary coil. The primary detector 9423 then communicates this to the controller 9500 which disconnects only the rogue primary coil.

Figure 22:
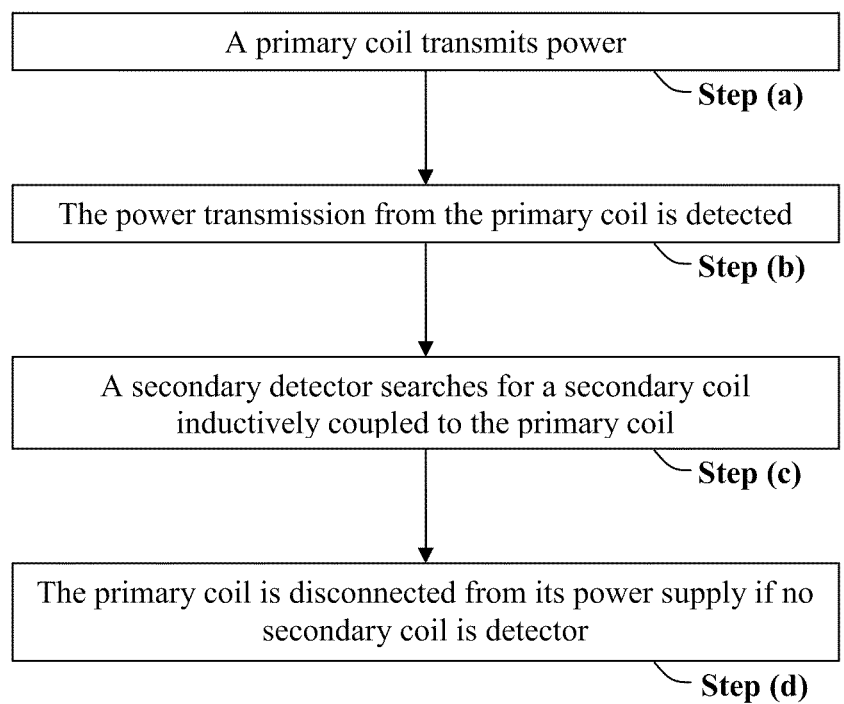
FIG. 22 is a flow-chart illustrating a method for preventing an inductive power outlet from transmitting power in the absence of an electric load coupled therewith, according to still another embodiment of the present invention.

A method for preventing an inductive power outlet of embodiments of the invention from transmitting power in the absence of an electric load coupled thereto, is presented in the flow chart of FIG. 22. The method includes the following steps:

a) a primary coil transmits power;

b) the power transmission from the primary coil is detected c) a secondary detector searches for a secondary coil inductively coupled to the primary coil; and d) the primary coil is disconnected from its power supply if no secondary coil is detector.

A number of power providing technologies and configuration have been described and set forth hereinabove. These technologies use inductive power supply inductors (primary inductors) coupled to secondary inductors associated with appliances. By virtue of the various embodiments, conductive power supply with the associated sockets and trailing wires may be replaced with elegant, solutions.

Reference is now made to FIG. 23 which is a block diagram representing the main components of an inductive transfer system 101 according to one embodiment of the present invention. The inductive transfer system 101 includes an inductive power outlet 201 and an inductive power receiver 301. The inductive power outlet 201 is configured to transfer power wirelessly to the inductive power receiver 301 by electromagnetic induction.

The inductive power outlet 201 consists of a primary inductor 221, wired to a power supply 241 via a driver 231. The driver 231 typically includes electronic components, such as a switching unit for example, for providing an oscillating electrical potential to the primary inductor 221. The oscillating electrical potential across the primary inductor 221, produces an oscillating magnetic field in its vicinity.

The inductive power receiver 301 includes a secondary inductor 321, which may be another coil of wire, configured such that, when placed in the oscillating magnetic field of an active primary inductor 221, a secondary voltage is induced across the secondary inductor 321.

It is noted that an induced secondary voltage across the secondary inductor 321 produces an alternating current (AC). Typically, this alternating current oscillates at a very high frequency. Where an electric load 341 requires direct current (DC), such as for charging electrochemical cells, a rectifier is needed to convert AC to DC. Where a load requires a lower frequency AC supply, an AC-AC converter or switching unit may be used to change the frequency.

It is a particular feature of embodiments of the invention that the secondary inductor 321 is wired to both a first circuit 331a and a second circuit 331b. The first circuit 331a includes a first electric load 341a wired directly to the secondary inductor 321 and the second circuit 331b comprises a second electric load 341b indirectly wired to the secondary inductor 321 via a rectification unit 333.

Figure 24A:
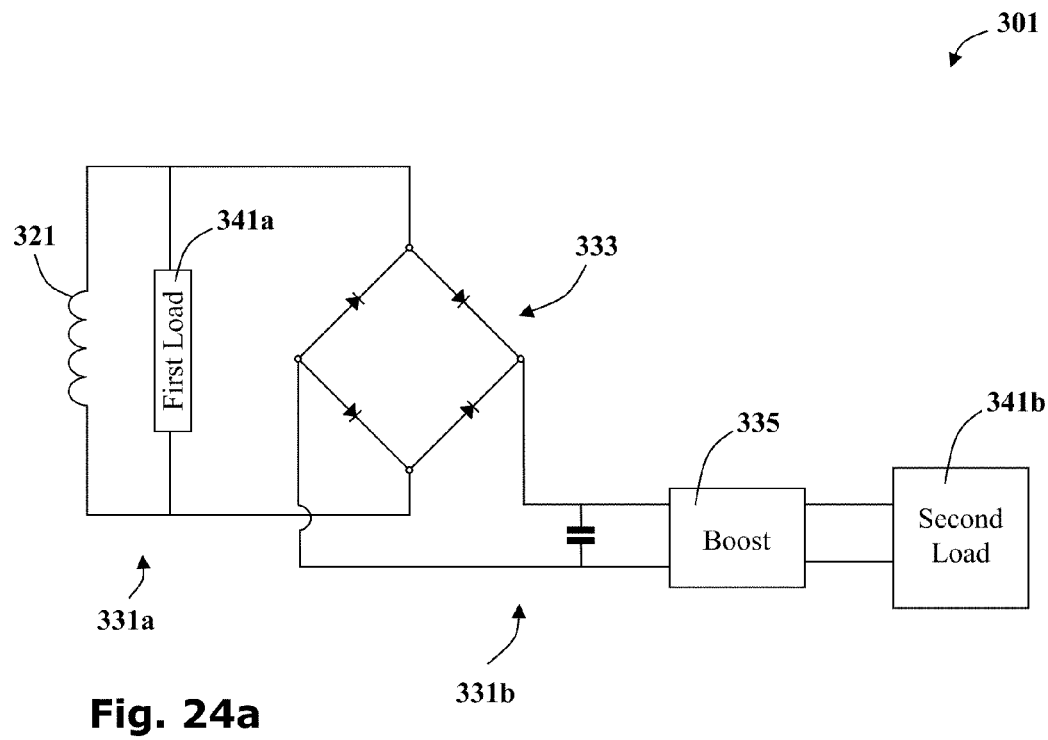
FIG. 24a is a schematic diagram of the inductive receiver including a secondary inductor wired to a first circuit and a second circuit.

With reference now to FIG. 24a, showing another embodiment of the invention, the inductive power receiver 301 includes the secondary inductor 321 wired to a first circuit 331a and a second circuit 331b. The first circuit includes a first load 341a, such as a heating element for example, which is typically operable with a high frequency alternating current. Because such loads do not need rectified power supplies, the first load 341a is directly powered from the output voltage of the secondary inductor 321. It will be appreciated that the efficiency of power transfer to the first load 341a is greatly improved because the current does not flow through a rectifier. This is particularly useful for example for powering heating elements or incandescent lamps, say.

The second load 341b is connected to the secondary inductor 321 via a rectification unit 333 and a boost circuit 335. The rectifying unit 333 may include a Graetz circuit or diode bridge consisting of four diodes arranged in a bridge circuit as described hereinabove. In preferred embodiments, however, a bridge synchronous rectifier is provided such as is described in co-pending patent application U.S. Ser. No. 61/071,151, incorporated herein by reference and as described below in relation to FIGS. 25a-c below.

Figure 24B:
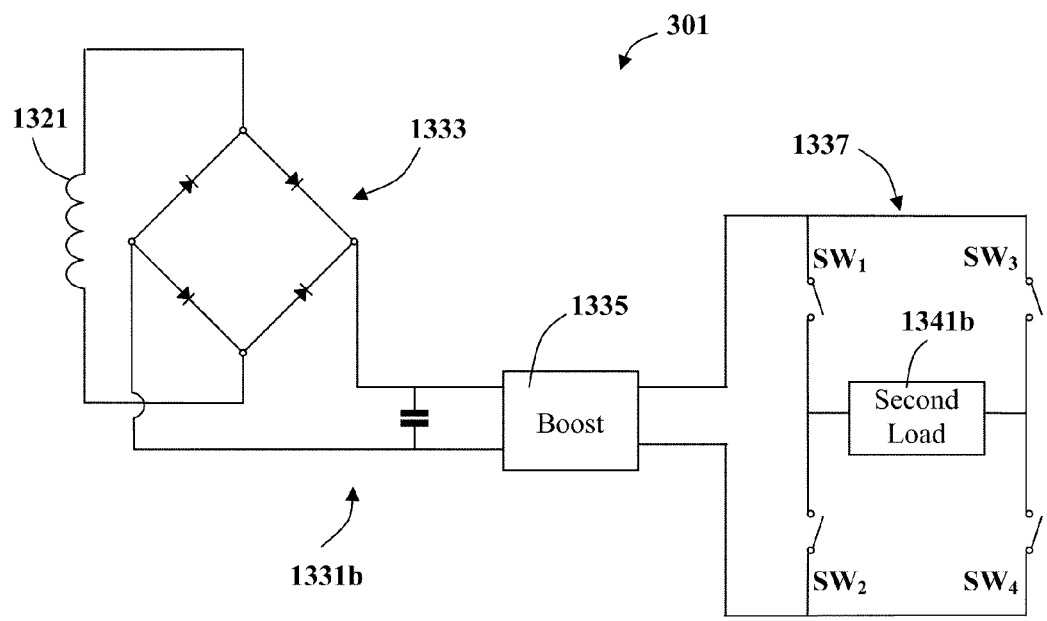
FIG. 24b is a schematic diagram of the second circuit including a boost circuit and a switching unit for controlling the power provided to a load according to another embodiment of the invention.

Referring now to FIG. 24b a schematic diagram is shown of a second circuit 1330b according to a further embodiment of the invention. The second circuit 1330b, includes a rectifier 1333 a boost circuit 1335 and a switching unit 1337. The switching unit 1337 is used for controlling the power provided to the load 1341b.

The switching unit 1337 includes four switches $SW_{1-4}$ configured to switch in sequence so as to provide a desired power profile of the output voltage. The term 'power profile' refers herein to the shape of the graph indicating the variation of voltage over time.

The boost circuit 1335 is a DC-DC power converter used to increase the output voltage of the rectifier 1333. For example, a typical DC output of 50-60V may be boosted to 160V to operate electrical devices in the United States or a typical DC output of 100-120V may be boosted to 320V to operate electrical devices in Europe. Various boost circuits of the art will occur to skilled electrical engineers.

It is noted that in various embodiments of the invention, the output of the second circuit may be controlled by using various combinations of buck circuits or boost circuits together with linear stabilizers. Furthermore, by varying the frequency and duty cycles of the switches, the switching unit may be used to provide AC output with a predetermined power-profile such as a simulated power-profile approximating that of a mains voltage supply. It is further noted that the switching unit may be used to simulate a multiphase power profile, even where the original power source may have a single-phase profile. Where a low voltage direct current is required a simple linear stabilizer of say 5 volts may be preferred.

Figure 25A:
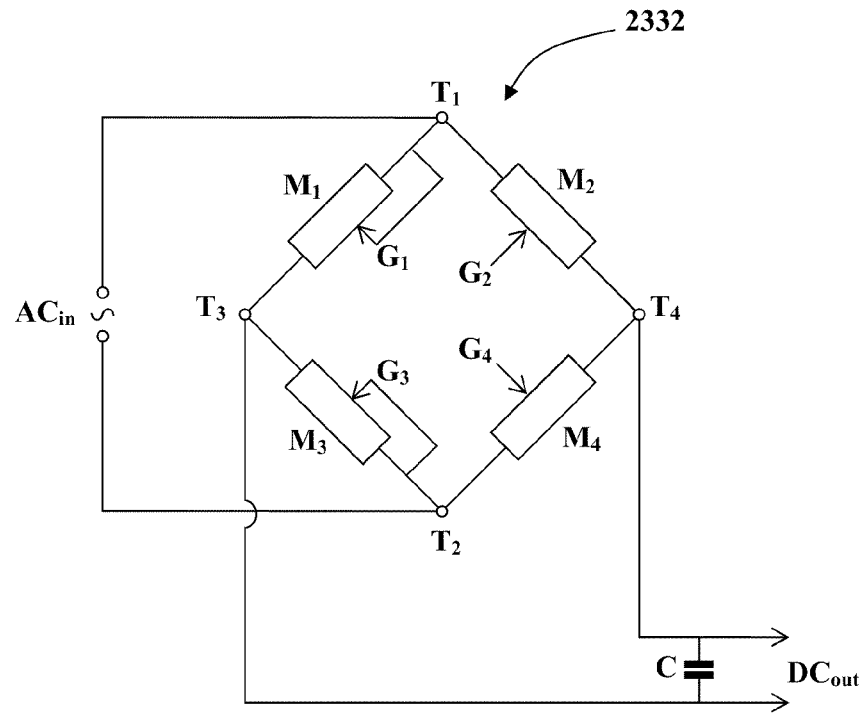
FIG. 25a is a block diagram of a synchronous full-wave rectifier according to an exemplary embodiment of the invention in which all four diodes of the diode bridge of FIG. 23 have been replaced by electronic switches.

FIG. 25a is a block diagram of a synchronous full-wave rectifier 2332 in which all four diodes of the diode bridge 333 (FIG. 24a) and 1333 FIG. 24b have been replaced by electronic switches $M_{1-4}$. In order to provide an output $DC_{out}$ of constant polarity, the switching signals $G_{1-4}$ need to be carefully controlled.

When the polarity of the first input terminal $T_1$ is positive relative to the polarity of the second input $T_2$, the first upstream and second downstream electronic switches $M_1$ and $M_4$ must be switched to the OFF state and the first downstream and second upstream electronic switches $M_2$ and $M_3$ must be switched to the ON state. When the polarity of the first input terminal $T_1$ is negative relative to the polarity of the second input terminal $T_2$, the first upstream and second downstream electronic switches $M_1$ and $M_4$ must be switched to the ON state and the electronic switches first downstream and second upstream electronic $M_2$ and $M_3$ must be switched to the OFF state.

Synchronization of the switching signals $G_{1-4}$, is complicated by an additional constraint. In order to prevent shorting across the output terminals, the upstream and downstream electronic switches along a common branch must never be in the ON state at the same time. In practice, when both of the switching signals $G_1$ and $G_2$ controlling the two electronic switches $M_1$ and $M_2$ along the first branch are each drawn from one of the input terminals $T_1$ and $T_2$, the two switches $M_1$ and $M_2$ are periodically both in their ON states. Because the switches $M_1$ and $M_2$ are adjacent along the first branch of the circuit, a short circuit is formed between the output terminals $T_3$ and $T_4$. Similar shorting may occur along the second branch when the switching signals $G_3$ and $G_4$ which control the other two electronic switches $M_3$ and $M_4$ are each drawn from one of the input terminals $T_1$ and $T_2$.

According to preferred embodiments of the invention, only the switching signals $G_2$ and $G_4$ for the downstream electronic switches $M_2$ and $M_4$ are drawn directly from the voltage at the input terminals $T_1$ and $T_2$ whilst the switching signals $G_1$ and $G_3$ for the upstream switches $M_1$ and $M_3$ are controlled independently. Preferably, the switching signals G1 and G3 are responsive to changes in the cathode current of switches $M_1$ and $M_3$ respectively.

Figure 25B:
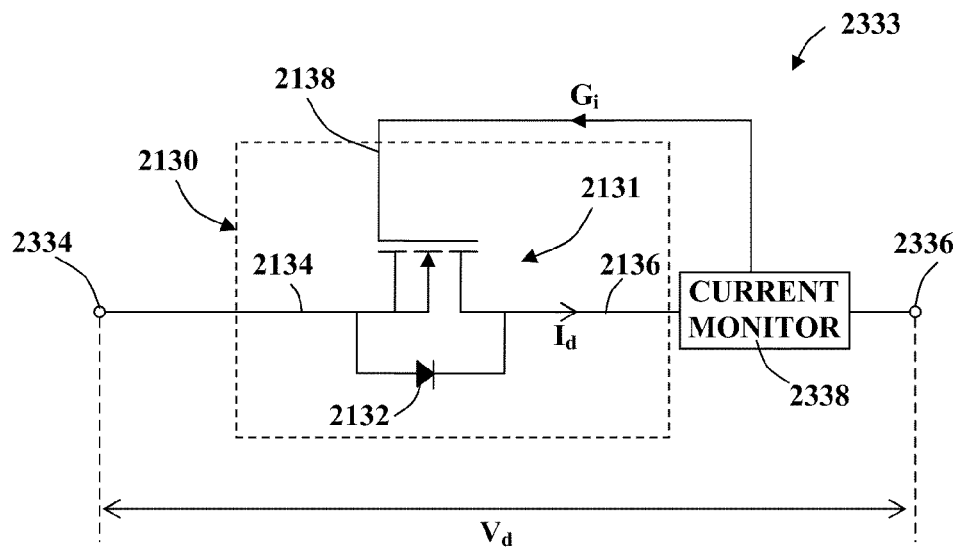
FIG. 25b is a schematic diagram showing a current triggered Power MOSFET which draws a gate signal from the current flowing through its drain terminal.

FIG. 25b shows a current-triggered synchro-rectifier 2333 according to an exemplary embodiment of the invention, which may serve as an electronic switch M incorporated into a bridge synchro-rectifier 2332. The current-triggered synchro-rectifier 2333 includes a Power MOSFET 2130 and a current monitor 2338. The current monitor 2338 is wired to the drain terminal 2136 of the Power MOSFET 2130 and is configured to send a current-based gate signal $G_i$ to the gate terminal 2138 of the Power MOSFET when the drain-current $I_d$ exceeds a predetermined threshold $I_{th}$. Although in the above example the current-triggered synchro-rectifier 2333 includes an n-channel MOSFET 2130, it will be appreciated that in other embodiments current-triggered synchro-rectifiers may incorporate p-channel MOSFETs.

Figure 25C:
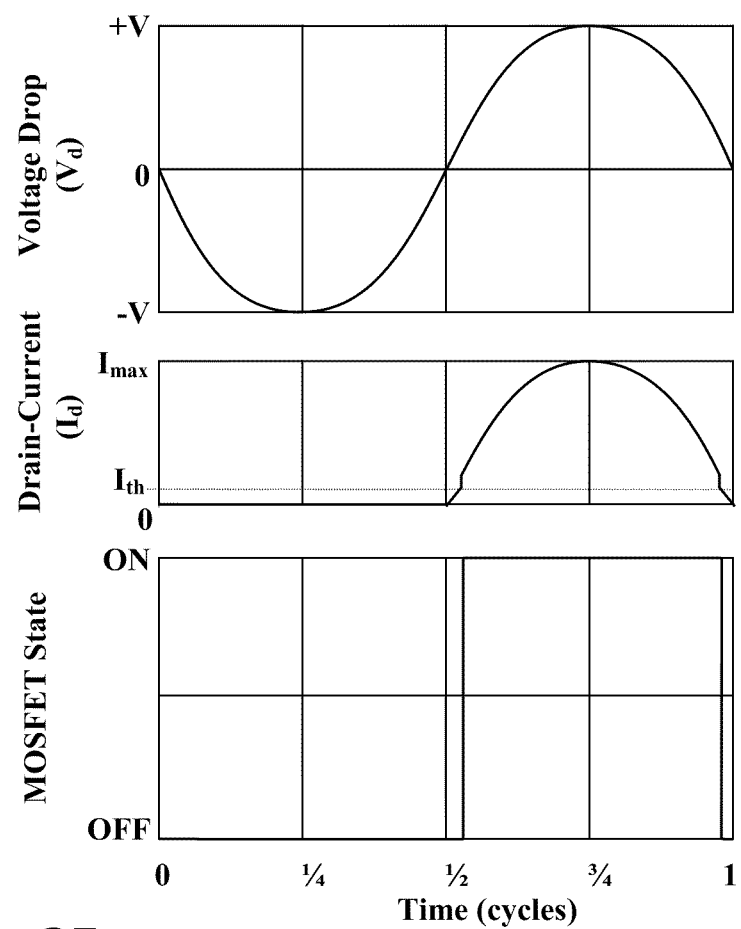
FIG. 25c is a graphical representation of the variations in drain-current and state of the MOSFET of FIG. 25b, over a single cycle of a sinusoidal input voltage.

In order to understand the functioning of the current-triggered synchro-rectifier 2333 consider the case where a sinusoidal alternating voltage is connected across the cathode 2334 and the anode 2336 terminals of the current-triggered synchro-rectifier 2333. FIG. 25c shows three graphs showing variations in: i) the voltage drop $V_d$ from the cathode 2334 to the anode 2336, ii) the drain-current $I_d$, and iii) the MOSFET state during one voltage cycle.

For the first half of the sinusoidal cycle the voltage drop $V_d$ between the cathode 2334 and the anode 2336 is negative, thus the polarity of the cathode 334 is negative relative to the anode 2336. Consequently, no current flows through the drain-terminal 2136 and the MOSFET remains in the OFF state.

At the beginning of the second half of the sinusoidal cycle, the voltage drop $V_d$ between the cathode 2334 and the anode 2336 increases above zero. The polarity of the cathode 2334 becomes positive relative to the anode 2336 so a small drain-current $I_d$ begins to flow through the diode 2132. This current is measured by the current monitor 2338.

During the third quarter of the cycle, the voltage drop $V_d$ between the cathode 2334 and the anode 2336 continues to rise. The current monitor 2338 measures an increasing drain-current $I_d$.

When the drain-current $I_d$ exceeds the predetermined threshold $I_{th}$, the current-based gate signal $G_i$ triggers the MOSFET 2130 to switch to the ON state.

As long as the MOSFET 2130 is in the ON state, current flows through the ohmic conductive path of the electronic switch 2131. Consequently, the drain-current $I_d$ varies in proportion to the voltage drop $V_d$.

During the last quarter of the cycle, the voltage drop $V_d$ between the cathode 2334 and the anode 2336 decreases. The current monitor 2338 measures a decreasing drain-current $I_d$.

When the drain-current falls below the predetermined threshold $I_{th}$, the current-based gate signal $G_i$ triggers the MOSFET 2130 to switch to the OFF state.

By way of example, in one application of the invention, an inductively powered bread-maker may include an inductive power receiver according to an embodiment of the invention. The inductive power receiver may include an inductive coil which is wired directly to a heating element, forming a first circuit. The inductive coil may be additionally wired to a second circuit including a motor connected to the inductive coil via a regulator including a rectifying unit, a boost circuit and a switching unit. Since the inductive power receiver does not need to be in conductive contact with the inductive power outlet in order to receive power, the inductive coil, heating element and second circuit may be sealed within a waterproof casing.

It is noted that in preferred embodiments, the bread maker incorporating the inductive power receiver is manufactured such that it is suitable to be cleaned in a dishwasher. This is facilitated, inter alia, by the use of an inductive coupling, allowing full sealing, which is difficult to obtain with conductive leads.

Although a breadmaker is described hereinabove, embodiments of the invention are applicable to other domestic applications such as blenders, coffee-makers, popcorn-makers, juicers, toaster-ovens, toasters, water heaters, deep-pan friers, chip pans, slow cookers, hot-plates, meat grinders, and the like. Still further embodiments of the invention will occur to those skilled in the art, particularly for use with wet environment equipment such as centrifuges, ultrasonic cleaning devices, magnetic stirrers and the like commonly used in the laboratory.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An inductive power receiver comprising at least one secondary inductor configured to inductively couple with at least one primary inductor and to provide power to at least one electric load, said receiver incorporated into a power adaptor further comprising at least one female power-jack socket electrically connected to said secondary inductor, said female power-jack socket configured to form a conductive coupling with a male pinned power plug connector.

2. The inductive power receiver of claim 1 wherein said secondary inductor is incorporated into a water resistant casing.

3. The inductive power receiver of claim 2 comprising at least one sucker configured to attach said casing to a worksurface.

4. The inductive power receiver of claim 1 further comprising a power storage unit configured to store energy received by said secondary inductor.

5. The inductive power receiver of claim 4 wherein said power storage unit is selected from a group consisting of: capacitors, accumulators and electrochemical cells.

6. The inductive power receiver of claim 1 further comprising a boost circuit connected to said secondary inductor via a rectification unit.

7. The inductive power receiver of claim 6 wherein said boost circuit comprises a switching circuit configured to approximate the power profile of a mains power supply.

8. The inductive power receiver of claim 6 wherein said primary inductor is connected to a power supply having a single-phase power profile and said boost circuit is configured to provide a multiphase power profile.

* * * * *